Figure 1:
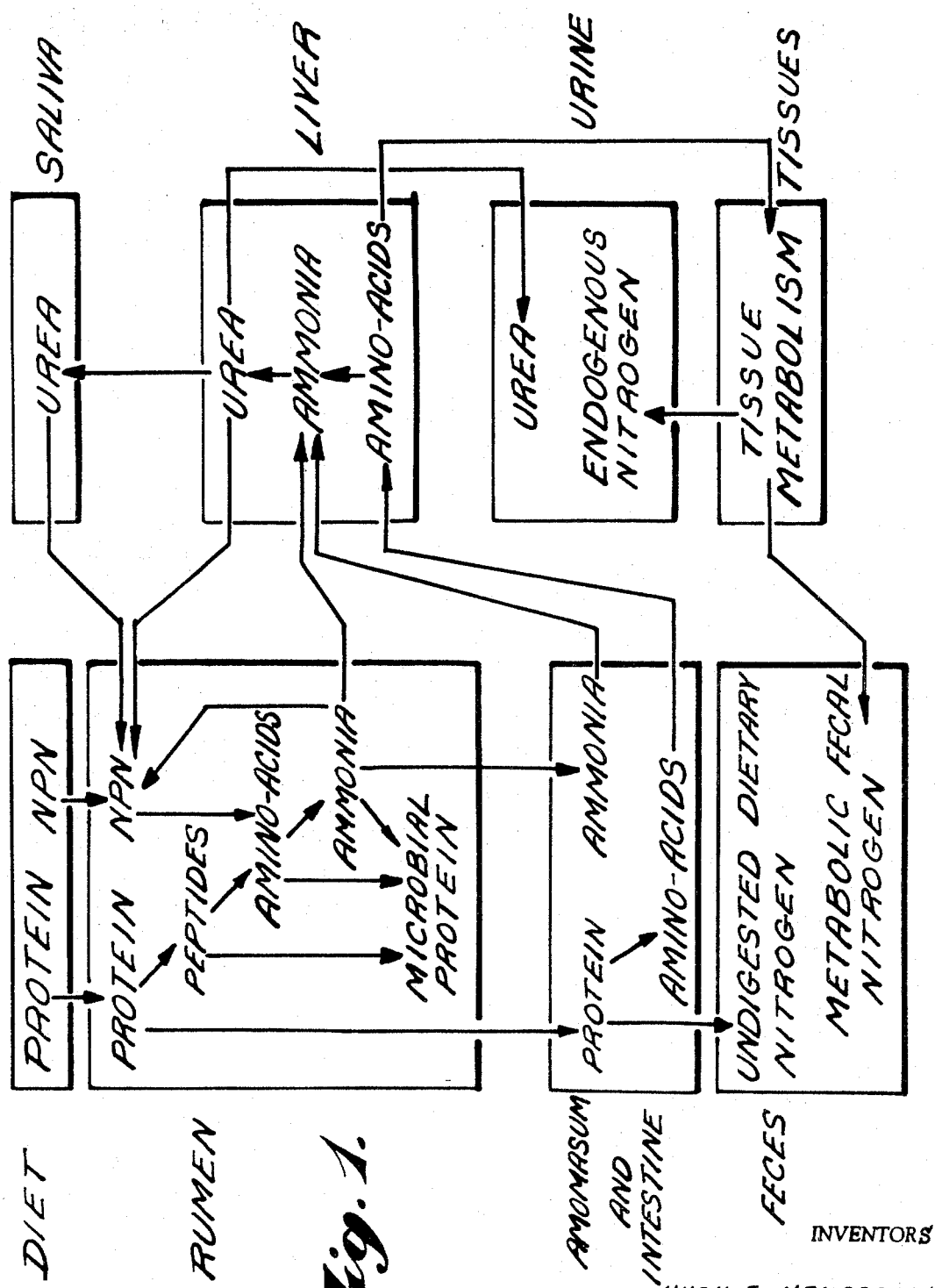

United States Patent [19]
Henderson et al.

[11] 3,753,723
[45] Aug. 21, 1973

[54] ANIMAL FEED AND METHOD OF MAKING SAME

[76] Inventors: Hugh E. Henderson, 1664 Algama, Okemos, Mich. 48864; John Talmage Huber, 1086 Haslett Rd., Haslett, Mich. 48840; Douglas Barrie Purser, 17 Dunkley Ave., Applecross, Australia

[22] Filed: July 31, 1970

[21] Appl. No.: 60,081

Related U.S. Application Data

[63] Continuation-in-part of Ser. No. 846,552, July 31, 1969, abandoned, Continuation-in-part of Ser. No. 826,620, May 21, 1969, abandoned.

[52] U.S. Cl. .......................... 99/9, 99/2 N
[51] Int. Cl. ............................... A23k 1/00
[58] Field of Search .............. 99/2, 2 N, 8, 8 E, 99/9

[56] References Cited
UNITED STATES PATENTS

| | | | |
|---|---|---|---|
| 2,603,567 | 7/1952 | Stiles | 99/2 |
| 2,940,857 | 6/1960 | Andrews | 99/8 |

FOREIGN PATENTS OR APPLICATIONS

| | | | |
|---|---|---|---|
| 762,648 | 11/1956 | Great Britain | 99/8 |

OTHER PUBLICATIONS

Pesotskiy, "The Effectiveness of Various Methods of Using Ammonia Water for the Enrichment of Corn Silage" Zhivotsnovodstvo, 1964, 26(10), pp. 58–62.

Abgarowicz, "An Attempt at Evaluating Silages of Corn With an Addition of Nonprotein Nitrogenous Compounds—Urea, Ammonium Sulfate and Ammonia Water" Roczrikirauk Rolniczych 1963, pp. 695–706, Vol. 81–B–4.

*Primary Examiner*—A. Louis Monacell
*Assistant Examiner*—Robert M. Elliott
*Attorney*—Cushman, Darby & Cushman

[57] ABSTRACT

A method for producing feed for ruminant animals wherein an aqueous ammonia solution is uniformly mixed with fermentable plant material. The mixture is fermented under anaerobic conditions, converting the ammonia to consumable nitrogen compounds. The ammonia may be added in admixture with molasses and mineral salts.

15 Claims, 4 Drawing Figures

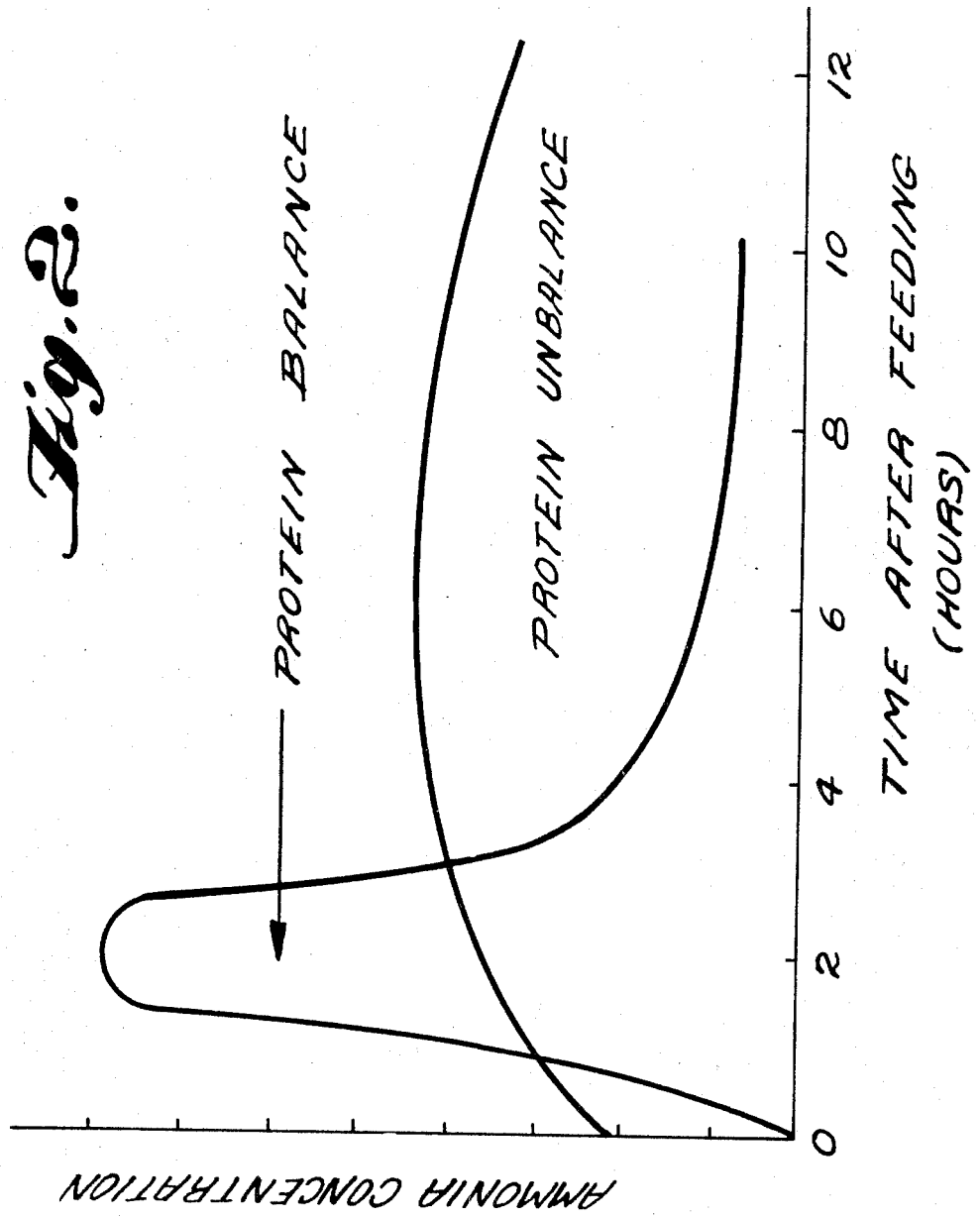

INVENTORS
HUGH E. HENDERSON
JOHN TALMAGE HUBER
DOUGLAS BARRIE PURSER
BY Cushman Darby & Cushman
ATTORNEYS

ANIMAL FEED AND METHOD OF MAKING SAME

This is a continuation-in-part of prior U.S. Pat. applications Ser. No. 826,620 filed May 21, 1969, and U.S. Pat. Ser. No. 846,552 filed July 31, 1969 both now abandoned.

The present invention relates to the feeding of ruminant animals and more specifically to the conversion of plant material to silage and the simultaneous conversion of ammonia into nitrogenous compounds palatable and non-toxic to ruminant animals. In its preferred form, the invention provides a process for the manufacture of an improved form of silage which itself is a complete ration for fattening beef cattle, wintering beef cows, dry dairy cattle, growing dairy and beef heifers, and a highly efficient ration component for lactating dairy cattle. The invention can be explained best by first reviewing fundamental principles of ruminant nutrition.

A ruminant is one of a group of hoofed animals including cattle, sheep, goats and deer which chew cud. These animals are characterized by a stomach having four chambers. When food is swallowed, it passes into the rumen where certain fermentation reactions may take place and digestion is in effect initiated. These reactions are an important feature of ruminant nutrition because they convert cellulose, which is indigestible by other animals, into a useable product. As explained below, they also facilitate consumption of other substances which are not normally regarded as foods for higher animals. Food from the rumen passes to the reticulum where it may be formed into small masses which are elevated to the mouth to be chewed. After chewing, the food is swallowed a second time. It then may pass from the reticulum to another stomach chamber called the omasum, which in turn is connected to the last chamber, the abomasum where still further digestion occurs.

Like simple stomached or monogastric animals such as dogs, cats and also man, ruminants can consume preformed proteins to meet a part of their nutritional requirements. However, it has been shown that ruminants use the preformed proteins only indirectly and that these feed proteins are first changed by rumen activity into ammonia and then reformed into proteins. For this reason, ruminants can be fed simple non-protein nitrogen (NPN) compounds instead of natural proteins permitting a substantial saving in feed costs. NPN in fact has been fed to cattle as a partial plant protein replacement for years; usually the NPN compound has been urea.

The biochemical activities which permit consumption of cellulose and NPN are unique characteristics of ruminant digestion. In ruminants (cattle, sheep, etc.) the rumen-reticulum acts as a common denominator for all nutritional regimen imposed. The rumen-reticulum harbors many microorganisms (bacteria and protozoa) which ferment all feed components into characteristic end products. These end products, regardless of the type of diet fed, are: gas, volatile fatty acids (VFA), and microbial cells containing protein, vitamin K and B complex vitamins. The gas is useless to the animal, the VFA provide energy, while the microbial cells are digested in the small intestines to provide protein and vitamins (not A, D and E) to the animals. The above statement means that regardless of the type of nitrogen source (plants or NPN) fed to a ruminant, the nitrogen will be converted into microbial protein. This conversion of feed nitrogen into microbial nitrogen or protein is never 100 percent complete; generally between 50 to 90 percent of feed nitrogen is converted into microbial protein.

After preformed protein or NPN are ingested by ruminants these feed constituents are immediately attacked by the microorganisms in the rumen-reticulum. The proteins are broken down into amino acids and finally ammonia, while the urea is very rapidly hydrolyzed into ammonia ($NH_3$) by the enzyme urease. As explained below, the greater speed of break-down of urea, compared to natural protein, limits its usefullness.

The $NH_3$ that was released from preformed proteins and NPN is reincorporated into microbial cells. Thus the nitrogen that was once in plant protein or NPN will be introduced into microbial protein. The microbial cells eventually leave the rumen and are propelled along into the intestines for digestion.

The complete utilization of urea or other NPN sources in ruminant metabolism is shown in FIG. 1. Urea is converted to ammonia in the rumen by the enzyme urease, and amino acids and microbial protein are synthesized by the bacteria from the ammonia so released. In addition, ammonia is absorbed through the wall of the rumen into the blood stream of the animal which transports it to the liver where it is converted to urea. As indicated in FIG. 1, portions of this synthesized urea are returned to the rumen, part is absorbed into saliva which also is carried to the rumen, and other portions of the urea are extracted into the kidneys and excreted.

As indicated above, urea has been used as a partial replacement for food containing natural protein. However, the extent to which urea can be utilized as a replacement is limited by cost and toxicity problems.

The cost of urea as a feed supplement is affected by rather low efficiency of utilization as well as manufacturing expenses. The basic reason for low efficiency is that the conversion of urea to ammonia is not synchronized with the utilization of ammonia by the bacteria. This is shown in FIG. 2. This is a graph which plots the concentration in the rumen of ammonia liberated from urea against time after the animal has been fed, and also the concentration of ammonia which can be used by the bacteria in manufacturing protein as a function of time after feeding. It will be noted that there is a very rapid increase in actual ammonia concentration because the hydrolysis of urea proceeds very rapidly. The ammonia concentration then falls rapidly to a fraction of its peak value and subsequently tapers off until almost all of the ammonia has disappeared. The reason for a rapid decline after an initial high concentration is the absorption of ammonia through the wall of the rumen. Prior to the time when the ammonia concentration falls below the concentration which can be used, the food in the rumen (urea, roughage, etc.) is said to be in protein balance because there is sufficient nitrogen available to the bacteria to satisfy their needs. However, as the ammonia is absorbed through the rumen wall, the ammonia concentration falls below that required to satisfy the bacteria, and this creates a condition of protein imbalance in the rumen. Digestion continues for several hours after feeding as food is transferred from the rumen, regurgitated, chewed, swallowed again and further digested in other stomach compartments. Therefore, it is apparent that urea is not capable of supplying nitrogen to the bacteria of the rumen in sufficient quantities except during a shot period of time after feeding. Furthermore, the efficiency of urea conversion is low because portions of the ammonia generated by it are absorbed through the rumen wall, converted back to urea by the liver and excreted. Consequently, it is necessary to feed natural proteins which liberate ammonia more slowly, along with the urea, to satisfy bacterial protein needs after the ammonia liberated from urea has been dissipated.

To a certain extent, efficiency of urea conversion is said to be improved by the feeding of carbohydrates such as molasses with the urea. The feeding of carbohydrates accelerates the activity of the bacteria and may perhaps increase the rate at which they can consume ammonia, thereby reducing the quantity which is available to be absorbed through the rumen wall. However, this does not eliminate the problem and urea molasses feed supplements are nevertheless inefficient.

Toxicity associated with urea is caused by the ammonia absorbed into the blood reaching excessive or toxic concentrations in the blood. Excessive concentrations can induce neurological disturbances, evidenced by crazy behavior of livestock and ultimately can cause death.

Because of the cost of urea feeding, both as a result of the expense of converting ammonia to urea and the urea wasted by the animals, consideration has been given to feeding ammonia—which is the raw material employed in making urea—as a feed constituent. If ammonia could be fed directly it could reduce the cost involved in making urea. However, experiments in feeding ammonia have been unpromising. In the first place, anhydrous ammonia, the least expensive form of this material, requires special handling which can create difficulties. Secondly, anydrous ammonia is a lachrymator, making if offensive to cattle and other live-stock so that it is not readily consumed. Furthermore, since it provides pure ammonia in the rumen, which is very rapidly absorbed through the rumen wall as discussed above, it increases the problems of potential toxicity and losses through excretion. Experiments have been carried out in which ammonia is first dissolved in molasses—by analogy to urea/molasses feeds. This mix may still be offensive and does not avoid absorption problems.

The object of the present invention is to provide a process in which ammonia is inexpensively converted to consumable nutrients not subject to the palatability and toxicity problems discussed above and at less cost than conversion to urea. Another object of the invention is to provide a feed supplement which can displace a larger proportion of the natural proteins normally fed to ruminant animals with nitrogen compounds derived from ammonia.

Briefly, these objects are accomplished by distributing ammonia uniformly throughout a mass of plant material fragments and subjecting the plant materials to anaerobic fermentation, in the presence of lactic acid producing bacteria, and more specifically by ensiling plant materials to which anhydrous ammonia has been added, in the manner and under the conditions set forth below.

One important aspect of the present invention is the conversion of ammonia to palatable, non-toxic nitrogen compounds along with the making of silage and without interference between the silage making process and the ammonia conversion process. The process of making silage is itself known, but for the sake of completeness the following summary description is provided.

Silage is widely used food for ruminant animals. It is obtained by anaerobic fermentation of plant materials in a silo. This is an enclosure constructed to substantially exclude air from the plant material so that fermentation can take place anaerobically. There are three principal types of silos. Two of these types are cylindrical structures, typically 16 to 30 feet in diameter and 50 to 80 feet tall. One of these types has its side walls constructed of concrete staves, and it has a metal dome as a cover. This structure is relatively airtight. There is an opening at the top for filling and there is a series of doors spaced vertically on the side for removing silage. An unloading device is provided for lifting silage from the top of the ensiled material and propelling it through one of the doors, the silage then falls by gravity to the bottom of the silo for feeding purposes. The unloader can be lowered as the material is removed. The second type of silo is of similar shape and equipment, but is constructed of metal plates bolted or welded together so as to be more airtight. The third type is a bunker silo which may be a ditch about 20 to 100 feet wide, 10 to 20 feet deep and 100 to 300 feet long. It is filled with plant material and usually left uncovered at the top, but anaerobic fermentation takes place in the interior of the material.

The silos are filled with plant material. In the first two types of silo, the chopped plant is fed to a blower which blows it through a pipe into the top of a silo. Generally the whole silo is filled at one time, within a few days, and fermentation of the whole mass takes place approximately simultaneously.

This fermentation will be described with reference to corn (maize), although it will be appreciated that similar processes take place in other plant materials.

The changes which take place in the ensiled corn plant are very complex but may be divided into two main classes, those of respiration, which occur before the cells of the plant die and those of fermentation, which occur as a result of microbial activity. The two are not distinct in reference to time after placing the plant in the silo. However, respiration changes take place in the initial stage of the ensiling process. The microbial activity in conjunction with the respiration activity is minimal and does not contribute appreciably to the end-products of the ensiling process.

RESPIRATION

When the crop is placed in the silo it is alive and, therefore, respiring actively.

Some air is unavoidably trapped in the mass. The oxygen is utilized by aerobic bacteria existing in the mass, and by the glycolytic pathway of sugar breakdown in the plant cells. The reaction is as follows:

$$C_6H_{12}O_6 + 6O_2 \rightarrow 6CO_2 + 6H_2O + 673 \text{ cal.}$$

In this reaction the plant cell is using the oxygen trapped in the mass. The 673 cal. are the source of heat causing the increase in temperature in the silo.

This phase of the ensiling process is called aerobic respiration. End-products of this phase of the process are a net production of carbon dioxide and heat. However, the reactions occurring at this time are not complete and other end-products are produced such as acetic and butyric acids and alcohols.

Proteolytic enzymes from the plant are now active in this phase and they break down some of the plant proteins to amino acids.

The phase of respiration is complete when the mass is completely devoid of oxygen, and the action of the anaerobic micro-organisms begins. Aerobic respiration lasts from five to ten hours in a tower silo free of air leaks.

FERMENTATION

Fermentation may be divided into four phases.

Phase 1: This is a relatively short phase characterized by the beginning of anaerobic micro-organism activity. The cell contents diffuse out of the cell due to chopping of the plant and are used by bacteria clinging to the plant when placed in the silo. The coliform group of organisms are active at this time and their activity results in the formation of acetic and butyric acids. The life of these organisms is short due to the drop in pH produced by their own activity, and since they are killed below pH 5.0.

Phase 2: This phase is the initiation of the lactic acid fermentation which is dependent upon the lactic acid-producing organisms, lactobacilli and streptococci. This activity is well underway at the end of 3 days and the establishment of this activity completes phase 2.

Phase 3: This is a stage of quiescence. Lactic acid production is continued and reaches its peak which should be 3.0 – 13.0 percent of the drymatter and the pH is constant at about 4.0. No further changes occur and the silage is fermented if the pH remains from 4.5 to 4.0 and no air is allowed into the mass.

Phase 4: If the pH does not drop below approximately 4.2 or if air is allowed into the mass, butyric acid producing organisms convert the soluble carbohydrates and lactic acid previously formed to butyric acid which is characteristic of spoiled silage. Also, proteins are broken down to amino acids and these are further degraded by deamination. This occurs from 17 – 21 days after filling.

The acids formed during these fermentation stages help to preserve the plant materials, and the fermentation also involves a certain amount of fragmentation and chemical change of plant materials, making them more readily digested by ruminant animals. In addition, lactic acid is a useful nutrient for the ruminant which can be converted to other compounds in the rumen by a process which provides energy.

It has been known for many years that urea may be introduced into the plant materials fed into a silo. There is sufficient urease available to hydrolyze at least part of the urea to ammonia, and the ammonia formed is converted, in part, to ammonium compounds, presumably the lactate. In addition, portions of the ammonia are consumed by bacteria, and thereby converted into protein. However, the silage obtained contains some free ammonia as well as unused urea. Because of this, and also because of the practical difficulties of handling urea, recommendations have limited amounts applied by farmers. The amount applied increases the crude protein level of the silage.

Since the filing of the original U.S. Pat. applications, Ser. No. 826,620 and Ser. No. 846,552, mentioned above, we have become aware of experiments in East Europe in which concentrated aqueous ammonia (24–25 percent) has been introduced into corn at the time of ensiling, the experiments being intended to compare the silage obtained with that produced when urea and ammonium sulfate are used. The reported results were disappointing in terms of the quality of the silage itself and the efficiency of incorporating ammonia into the silage. There were significant losses of the ammonia applied and an ammonia smell was observed in the silage. The lactic acid content of the silage was significantly less than in a control and, in one of the experiments, the qualitative evaluation on the Zubrilin scale was 8 compared to 12 for the control silage.

In accordance with the present invention, ammonia is effectively and efficiently converted to ruminant-palatable and non-toxic nitrogen compounds incorporated in silage which has a higher yield of lactic acid than control. The silage is of high quality and is an efficient, economical feed. In addition, it is possible to raise the nitrogen level sufficiently that the silage can supply the full protein requirements of fattening beef cattle. In a preferred embodiment, minerals are added with the ammonia and the silage is a complete and balanced ration for fattening beef cattle.

The invention is particularly useful with corn (maize). However, it also can be applied to other plant materials. Generally speaking, useful silage materials can be divided into five categories: (1) corn, (2) grass, e.g., orchard grass, (3) Legumes, e.g., clover, cowpeas and soy beans, (4) small grains, e.g., rye, wheat and barley, (5) Sorghum. Immature small grains might be classified as grass silage materials. The dry matter content of the plant material, at the time of ensiling should be 25 to 60 percent, preferably 30 to 35 percent. Another important characteristic is the fineness of chop which should be such that the plant material will pass through a screen of ¼ to ½ inch mesh.

The quantity of ammonia applied may be varied, depending on the crude protein equivalent desired for the silage and that of the initial plant material. There is no real minimum amount, since even small amounts of ammonia can be utilized, although it is preferred to use at least 0.5 percent of the dry matter. However, for reasons given more fully below, the amount of ammonia applied should be limited. At present, it is considered that the amount of ammonia applied should not exceed about 2.5 percent, preferably 2 percent, based on the dry matter of the plant material. In the case of corn (maize) the preferred range is about 0.5 – 1.6 percent, preferably 1.0 to 1.6 percent. Very small amounts will be useful with legumes. These contain sufficient natural protein from a nutritional point of view. However, during fermentation, it is necessary to provide nitrogen for bacteria. In ordinary silage, a portion of the natural protein is degraded to supply nitrogen for the bacteria. Therefore, when the present invention is practiced with legumes, it is necessary only to supply, with ammonia, the nutritional requirements of the fermentation bacteria.

The ammonia may, in principle, be added to the plant material by any means. The ammonia may be in the form of a gas or dissolved, e.g., in water. However, an important feature of the invention is that the ammonia must be intimately and substantially uniformly distributed onto the plant material. If the ammonia is not applied uniformly, the concentration in some parts of the silo may significantly exceed the average. In parts of the silo receiving too much ammonia, bacterial action may be impaired or altered sufficiently to prevent functioning of one or more of the types of anaerobic bacteria discussed previously and/or encourage activity by other types of bacteria which function at higher pH. Consequently, other parts of the silo will receive less than the average amount, although this is less detrimental. Therefore, it is desired that the average concentration of ammonia in each volumetric unit of the silo, e.g., each cubic foot, not exceed the maximum of 2.5 percent mentioned above. Preferably, the ammonia concentration in each such volumetric unit is within 25 percent, desirably within 10 percent of the average value of the silo.

Ammonia itself is a colorless gas which boils at normal atmospheric pressure at a temperature of −33°·34° C. The boiling point is increased with increasing pressure, and ammonia frequently is supplied in tanks under sufficient pressure to be liquid, at temperatures below the critical temperature of 132° C. If a silo is adequately closed, and means can be provided for keeping the gas fairly uniformly distributed among the plant material, ammonia will enter into reactions in the silo. However, ammonia is also very soluble in water, to the extent of about ½ gram per 1 gram of water at 20° C, and rapidly dissolves in water in the plant material. The dissolving liberates heat, so that non-uniform distribution of the ammonia can lead to uneven heating in addition to non-uniform concentration, and the temperatures in some parts of the silo may reach undesirable levels.

It also has been found possible to introduce ammonia into the silo by adding it to a stream of water flowing into the silo with the plant material. This spreads the ammonia about in the silo more uniformly, and tends to reduce losses of gas by evaporation. Another vehicle for the ammonia which has been found to be particularly useful is molasses. This product, which is a viscous liquid, has the added advantage of helping to suspend mineral additives. When the ammonia is dissolved in water or other liquid, it is preferred that the concentration be less than 25 percent of the whole material, preferably in the range 10–20 percent to assure even distribution.

Some of the difficulties associated with non-uniform distribution of ammonia on the plant material were observed in our initial experiment using gaseous ammonia. In that experiment the plant material consisted of whole corn plants cut to a three-eighth inch chop and having a dry matter content of about 45 percent. The chopped material was introduced into a large plastic bag previously placed inside a fiber drum. A ½ inch tube containing numerous small holes was inserted from the bottom to the top of the silage mass while filling the plastic bag with silage, for later injection of ammonia. An industrial vacuum cleaner was connected to the plastic bag and a vacuum drawn. The bag was then placed on a scale to accurately measure the amount of ammonia applied. The injection tube was then connected to a 1,500 gallon anhydrous ammonia tank. A valve was opened on the ammonia tank and the required amount of ammonia was introduced, following which the bag was closed. The tube was removed from the plastic bag and the bag was sealed shut. The plant material in the bag then was stored for 4 months at room temperature. Three lots of silage containing ammonia were made in this way, and four other lots were similarly prepared for purposes of comparison. The comparisons included untreated silage, two lots in which urea had been added and one lot in which soybean meal was added. In the cases of urea and soybean meal addition, these were mixed with the plant material in a horizontal mixer prior to introducing into a large plastic bag. In the case of the comparison materials, a vacuum also was drawn, but no ammonia was introduced. Table I summarizes the various lots of silage.

TABLE 1

A. Untreated silage (control), 8 percent crude protein equivalent
B. Silage plus soybean, 12 percent crude protein equivalent
C. Silage plus urea, 12 percent crude protein equivalent
D. Silage plus anhydrous $NH_3$, 12 percent crude protein equivalent
E. Silage plus urea, 16 percent crude protein equivalent
F. Silage plug anhydrous $NH_3$, 16 percent crude protein equivalent
G. Silage plus anhydrous $NH_3$, 20 percent crude protein equivalent The crude protein equivalent values given in Table 1 are calculated on a basis of 1 pound of nitrogen being equivalent to 6.25 pounds of crude protein, and are based on the nitrogen introduced. In all, four 200 pound lots of each type of silage shown in the table were put up.

Samples were taken and analyzed with the results being recorded in Table 2. It was found that the ammonia incorporation by this preliminary method was not completely uniform. This was particularly noticed at higher nitrogen levels. Consequently, it was concluded that the technique might be used effectively when low nitrogen levels are sought, so that portions of the silo receiving higher than the average amount would be less likely to exceed a permissible maximum. In spite of these difficulties, however, the silage was fed to fistulated sheep. Dry matter digestibility data was obtained which showed that ammonia was at least as effective as urea in enhancing silage utilization by ruminants, and, more importantly, ammonia could be fed to the animals after treatment in a silo, whereas the anhydrous ammonia itself could not be fed to them. However, intake data showed the inferiority of the ammonia treated product where the ammonia was not properly mixed with the total silage mass. The following is the data obtained from this experiment:

TABLE 2.—TREATMENTS

|  | A control | B soybean 12% CP | C urea 12% CP | D $NH_3$ 12% CP | E urea 16% CP | F $NH_3$ 16% CP | G $NH_3$ 20% CP |
|---|---|---|---|---|---|---|---|
| Silage dry matter, percent | 44.2 | 46.2 | 44.9 | 43.2 | 47.0 | 43.7 | 45.4 |
| pH 4/23/68 | 4.22 | 4.17 | 6.68 | 8.73 | 7.35 | 4.18 | 4.46 |
| CP, percent | 7.6 | 10.8 | 12.2 | 27.8 | 15.2 | 7.8 | 9.0 |
| Dry matter intake, g./day | 821 | 948 | 777 | 733 | 857 | 713 |  |
| Dry matter* digestibility, percent | 67.0 | 72.3 | 71.5 | 71.5 | 72.4 | 78.3 |  |

*Dry matter digestibility is determined from measuring the food ingested and the excrement, according to the equation:

$$\text{Dry Matter Digestibility} = \frac{\text{Food Consumed} - \text{excrement}}{\text{Food Consumed}} \times 100$$

In an effort to achieve more uniform mixing, ammonia was added to silage in the form of a solution in water. The ammonia was introduced into a stream of water flowing into the blower which propels the plant material to the top of the silo. A simple T connection into the pipe through which the water was flowing was used, and the amount of ammonia introduced was metered by having a tank on a scale. The amount of ammonia used was about 5 pounds per each 60 pounds of water and each ton of plant material. By this method of introduction of ammonia, each piece of plant material receives a part of the aqueous ammonia.

EXAMPLE I

Various lots of corn silage were put up in accordance with the following table:

| Silo | No. of Pounds | % Dry Matter When Filled | Treatment |
|---|---|---|---|
| A | 93,140 | 37.84 | 10 lb. urea/ton plant material |
| B | 96,600 | 38.26 | Control |
| C | 63,775 | 39.19 | 5 lb. ammonia gas + 60 lb. water/ton plant material, introduced into blower |

The treated silages were stored in a silo for approximately 4 months and then a 9 week feeding trial was conducted with 28 Holstein cows and the milk yields in pounds per day were determined. The averages for the several groups of animals were as follows:

RATION

| | Negative control, silage B | Positive control[1] | Silage A (urea) | Silage C (ammonia) |
|---|---|---|---|---|
| Milk yield (lb./day): | | | | |
| Standardization | 61.7 | 61.0 | 61.6 | 62.1 |
| Treatment | 42.7 | 56.5 | 58.8 | 55.1 |
| Feed intakes (percent of body weight): | | | | |
| Silage dry matter | 1.12 | 1.60 | 1.51 | 1.67 |
| Total dry matter | 2.36 | 2.76 | 2.91 | 2.93 |

[1] Silage B with soybean meal added to give a protein level equivalent to nitrogen levels in silos A and C.

The results on cows receiving the positive control and silages A and C were within experimental error but are significantly better than the negative control. The intake of silage C indicates an absence of palatability problems associated with the use of ammonia. The following data show the chemical analysis for various types of nitrogen.

| Silage | Dry Matter | Crude Protein* (% of dry matter) | Ammoniacal** nitrogen (% of dry matter) | Urea*** nitrogen (% of dry matter) |
|---|---|---|---|---|
| A | 34.4 | 12.8 | 0.358 | 0.480 |
| B | 35.5 | 8.8 | 0.132 | 0.148 |
| C | 35.4 | 11.4 | 0.458 | 0.117 |

*Based on nitrogen determined by Kjeldahl analysis.
**Ammoniacal nitrogen determined by steam distilling ammonia from silage, absorbing the ammonia in acid solution and titration, see Association of Official analytical Chemists, 1965, *Official Methods of Chemical Analysis* 10th ed.
***Urea nitrogen determined by the calorimetric method of Brown using p-dimethyl aminobenzaldehyde, see *Analytical Chemistry* 31:1844

As mentioned above, it also is possible to suspend the ammonia in molasses before introducing it into the silo. In this regard, the term "molasses" includes a wide variety of highly concentrated sugar solutions, more detailed information with respect to which may be had from the Encyclopedia of Chemical Technology, second edition, volume 13, pages 613-632. Various grades of cane sugar molasses may be used as well as sorghum syrup, beet sugar molasses, corn molasses, citrus molasses and wood molasses. These concentrated solutions preferably should have a carbohydrate content of at least about 40 percent, and normally include, in addition to various sugars, small quantities of crude protein, and minerals. A typical composition for cane blackstrap molasses will be about 80 percent solids of which 62 percent, approximately, is sugars, ordinarily about 32 percent sucrose, 14 percent dextrose, and 16 percent levulose. Beet sugar molasses is about 51 percent sucrose, and also contains about 2 percent of other sugars. These viscous solutions are useful because they can be employed to suspend mineral additives which are required for balancing the diet of the ruminant animals. Thus, the silage can supply the complete nutritional needs of the animal. Current information indicates that molasses has the further advantage of holding a high concentration of ammonia.

Cane sugar molasses is preferred at the present time because it is less expensive than beet molasses. However, unlike beet molasses, the cane molasses is slightly acid, normally having a pH of about 5.5-6.5 whereas beet molasses is alkaline, having a pH of about 7.5-8.6. Because of this acidity, small portions of the ammonia added to cane molasses will be neutralized and converted to ammonium salts. However, in this form, they are useful as NPN.

In general, the amount of ammonia introduced into molasses will be about 10 to 25 percent preferably 10-20 percent by weight of the molasses. Using the Conway analytical procedure described below substantially all, i.e., at least 95 percent –99 percent or more ordinarily of the nitrogen in the molasses is in the form of ammoniacal nitrogen.

In adding ammonia to molasses, care must be exercised not to heat the molasses. Ammonia can react with alcohols, including sugars, at elevated temperatures, to form organic compounds which prevent the ammonia from participating in the silage reactions. It is believed that the ammonia reacts with organic acids, as they are formed, to produce salts, but the products of reacting ammonia with the sugars in molasses will not function in this way.

The following is the analysis for a typical feed composition which can be formulated using ammonia and molasses.

Formulation To Be Added To Each Ton

Of 30 percent DM Corn Silage 10 to 25 lb. Cane Molasses 6.75 lb. Nitrogen (14 percent CPDM)
2.6 lb. NaCL (2 gm/lb. DM)
440 gm Sulfur (S1:N8)
363 gm Calcium (0.44 percent DM)
272 gm Phosphorus (0.33 percent DM)
144 gm Magnesium (0.24 gm/lb. DM)
12 gm Iodine (0.20 mg/lb. DM)
2 gm Copper (3.3 mg./lb. DM)
30 mg Cobalt (0.05 mg./lb. DM)
10 mg Zinc (16 mg./lb. DM)

The following actual feed formulation has been made up to provide approximately this analysis:

EXAMPLE 2

The following materials were mixed together:

| | |
|---|---|
| Cane molasses | 62.8000% |
| Aqueous ammonia (23.5% N) | 28.5500% |
| Magnesium chloride (6H20) | 1.9000% |
| Sodium chloride | 1.8900% |
| Diammonium phosphate | 1.8900% |
| Calcium chloride | 1.5600% |
| Wettable sulfur | 0.7000% |
| Micro mineral mixture[1] | 0.6810% |
| Copper sulfate (5H20) | 0.0226% |
| Cobalt sulfate (7H20) | 0.0113% |
| Total | 100.000 % |

[1]Composition of Micro Mineral Mixture: 1.75% Iron, 2.00% manganese, 2.30% Zinc, 0.85% Iodine, 0.60% Copper, 0.45% Cobalt.

In this case, aqueous ammonia was used because of availability. However, similar formulations have been made introducing anhydrous ammonia into a premix of suitable salts and water and then adding molasses. Considerable heat is liberated as the ammonia is dissolved and it is removed by a cooler to preclude overheating which might induce reaction between ammonia and the carbohydrate content of molasses.

This formulation was evaluated and compared with other silage additives as follows:

| Silo | Dry Matter **** of Chopped Corn | Additive |
|---|---|---|
| 12 | 35% | None |
| 5 | 43% | Urea* |
| 3 | 46% | Urea, shelled** corn and minerals |
| 1 | 53% | Aqueous ammonia formulation*** Applied through blower |

*Sufficient to increase crude protein from about 8 to 12%.
**Minerals the same as in the formulation above with aqueous ammonia. Sufficient urea to be isonitrogenous with the aqueous ammonia formulation. Sufficient shelled corn to be isocaloric with the aqueous ammonia formulation.
***Sufficient to increase crude protein from about 8 to 11%.
****Dry matter variations resulted from loading silos over a period of about three weeks during which the corn matured.

The corn was ensiled about 150 days before commencement of evaluation.

Samples were taken at this stage and one month later, and the following analyses were obtained:

| Silo | Crude Protein | Soluble nitrogen as a percent of total | Ammonia nitrogen as a percent of total** |
|---|---|---|---|
| 12 | 7.4% | 47% | 9% |
| 5 | 14.0% | 55% | 31% |
| 3 | 13.5% | 47% | 15% |
| 1 | 10.5% | 43% | 19% |

** Measured by the method of Conway – See E. I. Conway, Microdiffusion Analysis and Volumetric Error (1950). This method involves homogenizing silage in a Waring blender, placing the sample in one compartment of a dish which contains saturated potassium carbonate. The carbonate liberates ammonia which diffuses through the air in the dish to the other compartment where it is absorbed in boric acid solution. The amount of ammonia absorbed is measured by titration.

The ammonia treated silage obtained in accordance with the present invention is useful either as the whole food for animals or as a partial feed. The way in which it is used depends in part on the kind of animal being fed and the objectives of the feeding program. For example, beef cattle in a feed lot may be fed ad libidum 100 percent on ammonia treated corn silage containing added minerals. The animals are held in groups of 8 and are fed twice a day. The amount to be offered at each feeding is adjusted to just about the amount the animals will consume. Water also is offerend ad libidum. Present information indicates that the amount of ammonia added should be sufficient for the crude protein equivalent of the silage to be at least about 12 percent on a 100 percent dry matter basis. Currently, as a precautionary measure, a crude protein level of 13.0 percent is recommended, bearing in mind possibly inaccurate application by farmers and the metabolic studies discussed below. The animals also are supplied separately with vitamin A — which is destroyed in a silo — and may be implanted with diethylstilbestrol.

EXAMPLE 3

Commencing after about 150 days of storage, and using the silages described above in Example 2, a factorially designed (4 silage × 3 protein levels) feeding trial was conducted for 106 days with the following results:

| 106 Day Test | Silo 1 | Silo 3 | Silo 5 | Silo 12 |
|---|---|---|---|---|
| Average initial wt., lb. | 761 | 758 | 762 | 763 |
| Average final wt., lb. | 1039 | 1051 | 1028 | 1000 |
| Average daily gain, lb. | 2.62 | 2.76 | 2.51 | 2.57 |
| Average Daily Feed Consumed lb. 85% DM | | | | |
| Corn silage | 20.12 | 19.47 | 16.82 | 16.45 |
| Shelled corn | 1.20 | 1.20 | 1.04 | 1.78 |
| Supplement | 0.74 | 0.73 | 1.70 | 0.77 |
| Total | 22.06 | 21.40 | 19.56 | 19.00 |
| Feed per lb. gain | 8.42 | 7.75 | 7.79 | 7.39 |
| Daily feed consumed as percent of body wt. | 2.45 | 2.36 | 2.19 | 2.15 |
| Feed cost per wt. gain($) | 11.37* | 11.63** | 11.69*** | 11.09*** |
| Average carcass grade | low choice | low choice | high good | low choice |
| Average degree of Marbeling | modest | modest | modest | slight |

*Silage at $9.50/ton
**Urea – mineral – shelled corn silage at $10.50/ton
***Urea treated silage at $10.50/ton
****Control silage at $9.50/ton Because of elevated dry matter level in silo 1, inadvertently the crude protein level was lower than planned. Therefore, to determine whether the results were influenced by low protein level, the above trial included a study in which the crude protein levels of all silages were increased by addition of soybean oil meal and/or urea by about 4 percent. When this was done, the cattle fed with silage 1 outgained all other treatment groups, indicating the protein in silage 1 was below the level for maximum performance but the initial level was adequate in silages 3, 5 and 12.

During the course of the feeding trials, a metabolic study was conducted using fistulated lambs to measure dry matter digestibility, rumen volume and turnover, rumen volatile fatty acids, rumen ammonia nitrogen, blood urea nitrogen and various parameters of nitrogen metabolism.

| Silo | Dry Matter Digestibility | Rumen Ammonia | Urinary Nitrogen as a Proportion of Intake |
|---|---|---|---|
| 1 | 73.9% | 7.32 | 24% |
| 3 | 74.6% | 18.97* | 36% |
| 5 | 72.1% | 18.31* | 40% |
| 12 | 69.1% | 2.32** | 27% |

*Indicates excessively high ammonia levels and inefficient nitrogen utilization.
**Reflects low protein level of silage.

Based upon the experiments with the silages in Example 2, a somewhat modified formulation for beef cattle has been prepared and was recommended for application at the following rates:

| Silage Dry Matter | Ammonia-Molasses Product | | Resulting Crude** Protein |
|---|---|---|---|
| | lbs. | gal.* | |
| 30% | 44 | 4.4 | 13.66 |
| 35% | 50 | 5.0 | 13.65 |
| 40% | 58 | 5.8 | 13.65 |

*Assuming a density of 10 lbs. per gallon.
**Assuming use with 8% crude protein silage on a dry matter basis.

The formulation for which these recommendations were made contained:

TABLE 3

| | |
|---|---|
| Anhydrous Ammonia | 15.42% |
| 79.5 Brix Cane Molasses | 55.00% |
| Magnesium Sulfate | 1.05% |
| Diammonium Phosphate* | 2.07% |
| Calcium Chloride | 2.20% |
| Potassium Chloride | 0.06% |
| Magnesium Chloride | 0.03% |
| Sodium Chloride | 5.19% |
| Miscellaneous Minerals** | 0.87% |
| Water to dissolve salts | |

*Included in crude protein.
**1.011% Cu, 0.025% Co, 6.068% Zn, 6.068% I and 70.401% S.

Dairy cattle have different nutritional requirements, which vary from time to time. Heifers, cows not lactating and cows during the last stages of the 10–12 month lactation period, can be fed on a ration where the ammonia added to the corn silage furnishes 100 percent of the supplemental nitrogen in the ration. However, high producing dairy cows during the first one-half to two-thirds of the lactation period require a higher energy feed. This is because of limitation on the amount of roughage the animal can digest. During the high producing stage of lactation, a cow will produce only about 40 pounds of milk per day on the amount of corn silage ration she can consume, but the yield can be increased to as high as 100 pounds per day, with an average of 60 pounds per day, on a higher energy ration, partially supplemented with natural protein. A preferred method of increasing the energy of the feed is to add shelled corn to the feed, and soybean meal may be introduced to provide natural protein.

The following example describes a further study comparing ammonia and urea treated silages.

EXAMPLE 4

Chopped corn was treated with aqueous ammonia made by adding anhydrous ammonia to water flowing into the blower as described above. Comparison silages were made by introducing urea in conventional manner. No additions were made other than urea or ammonia.

After about 100 days storage, the total nitrogen contents of the silages were measured and were as folows, in terms of crude protein content:

| Silage | Treatment | Dry Matter | Crude Protein |
|---|---|---|---|
| 1 | Urea | 36% | 11.6% |
| 2 | Urea | 52% | 11.3% |
| 3 | Ammonia | 42% | 9.3% |

The crude protein level obtained with aqueous ammonia was less than intended indicating a part of the ammonia was lost by evaporation, only about 50 percent of the quantity introduced having been retained. In view of other work, it is current opinion that aqueous ammonia uptake is diminished as the degree of maturing of corn increases. This problem has not been experienced when molasses is used as a carrier for the ammonia.

These silages were evaluated in a dairy cattle trial involving 18 cows who were fed the silages ad libitum along with the following ration at the rate of one pound for each three pounds of milk:

| Component | Amount by weight |
|---|---|
| Ground shelled corn | 85% |
| Soybean meal 50% crude protein | 5% |
| Molasses | 7% |
| Dicalcium phosphate | 1.5% |
| Trace mineralized salt | 1.0% |
| Limestone | 0.5% |

The results were as follows:

| | Silage 1 | Silage 2 | Silage 3 |
|---|---|---|---|
| Milk Yields | | | |
| Standardization (kg/day) | 33.3 | 33.3 | 33.2 |
| Treatment | 27.3[b] | 25.6[b] | 24.4[b] |
| Persistency | 82.6[b] | 77.0[b,c] | 73.3[c] |
| Treatment/Standard × 100 | | | |
| Butterfat (g/day) | 928.0[b] | 717.0[c] | 610.0[c] |
| Butterfat (%) | 3.4 | 2.8 | 2.5 |
| Body weight gain | +0.46[b] | +0.05[c] | +0.30[b,c] |

[b,c] Values not sharing a common superscript are significantly different ($P<0.05$)

In part these results are related to reduced consumption of silage by dairy cows as the maturity level of the silage increases (determined in other studies with corn silage). This is reflected in the following data collected during the foregoing trial.

| | Silage 1 | Silage 2 | Silage 3 |
|---|---|---|---|
| | consumption (% of bodyweight) | | |
| Corn silage (kg/day) | 1.66[a] | 1.24[b] | 1.19[b] |
| Total (kg/day) | 3.21[a] | 2.68[b] | 2.57[b] |
| Milk yield/kg dry matter | 1.47[a] | 1.62[b] | 1.56[a,b] |

[a,b] Values not sharing a common superscript are significantly different ($P<0.05$)

Nitrogen balance data during this trial indicates that the nitrogen in the ammonia treated silage was utilized at least as well as nitrogen derived from urea treated silage

| | Silage 1 | Silage 2 | Silage 3 | Std error |
|---|---|---|---|---|
| Nitrogen intake | 283[a] | 252[b] | 242[c] | |
| Nitrogen secreted (%) | | | | |
| in milk | 46 | 45 | 39 | ±1.9 |
| in urine | 26 | 23 | 21 | ±1.4 |
| in feces | 48 | 40 | 43 | ±1.7 |
| Total | 120 | 108 | 103 | |
| Nitrogen balance (g/day) | −58 | −20 | −8 | |

[a,b,c] Values not sharing a common superscript are significantly different ($P<0.05$)

EXAMPLE 5

In an experiment similar to Example 4, the following silages were compared

|    | Dry Matter |                                                                                                                                      |
|----|------------|--------------------------------------------------------------------------------------------------------------------------------------|
| 1. | 32%        | None — control                                                                                                                       |
| 2. | 30%        | 30 lbs. of aqueous ammonia containing 22% nitrogen per ton of wet silage                                                             |
| 3. | 30%        | 50 pounds per ton of wet silage of formulation of Table 3.                                                                           |
| 4. | 42%        | 50 pounds per ton of wet silage of formulation of Table 3.                                                                           |
| 5. | 30%        | Urea, 15 pounds per ton of wet silage                                                                                                |
| 6. | 31%        | 15 pounds of urea and 25 pounds of minerals per ton of wet silage, the minerals being sufficient to totally meet the needs of the lactating cow. |

The silages obtained were evaluated in a trial involving six cows per treatment after a 3 week standardization period during which the cows each received a daily ration consisting of grain at 1 pound per 3 pounds of milk, hay ad libidum and a mixture of the treated silages. During the treatment period they received 5 pounds per day of hay, treated silage ad libidum and a 13 percent crude protein concentrate. The rations were supplemented with minerals as necessary to make up for amounts not furnished in the silage treatment.

The results of the experiment were as follows:

MILK YIELDS AND SILAGE INTAKES OF COWS FED SILAGES TREATED WITH VARIOUS NPN ADDITIVES (8 week average)

| Silage | MILK YIELDS STD. kg/day | TRT. kg/day | CHANGE kg/day | Silage DM Intake kg/day |
|--------|---|---|---|---|
| 1 | 30.1 | 26.4 | −3.7 | 19.7 |
| 2 | 30.6 | 27.0 | −3.5 | 20.2 |
| 3 | 29.9 | 27.2 | −2.6 | 20.2 |
| 4 | 29.9 | 26.8 | −3.1 | 17.9 |
| 5 | 30.3 | 26.2 | −4.2 | 18.0 |
| 6 | 29.6 | 25.3 | −4.3 | 18.3 |

A fall in milk output normally would be expected at this stage of lactation. However, the reduction in groups 3 and 4 were less. Group 2's relatively poor performance is presently attributed to the molasses and minerals in Silos 3 and 4 and their absence from Silo 2.

More detailed information regarding the nutritional needs of cattle and other ruminant animals is provided in a series of publications of the National Academy of Sciences, National Research Council titled Nutrient Requirements of Domestic Animals, particularly the pamphlets entitled *Nutrient Requirements of Beef Cattle*, *Nutrient Requirements of Horses*, *Nutrient Requirements of Dairy Cattle* and *Nutrient Requirements of Sheep*.

EXAMPLE 6

A series of experiments have been conducted to determine the effect of the various components of the mixture of ammonia (A), salts and molasses (M). The formulation shown in Table 4 was subdivided into four groups as indicated.

TABLE 4

| Group | Element | Percent |
|-------|---------|---------|
| A | Nitrogen (Anhydrous ammonia) | 13.13 |
| M | Cane Molasses | 55.12 |
| CPS | Calcium | 0.7936 |
|  | Phosphorus | 0.4850 |
|  | Sulfur | 0.9371 |
|  | Sodium | 2.0450 |
|  | Chlorine | 3.8420 |
|  | Magnesium | 0.4886 |
| TMS | Copper | 0.0088 |
|  | Zinc | 0.0597 |
|  | Iodine | 0.0530 |
|  | Cobalt | 0.0002 |
|  | Water and Inert Ingredients | 23.04 |
|  | Total | 100% |

Rates of application per ton of 35 percent dry matter silage were as follows:

| GROUP A | Pounds |
|---|---|
| Anhydrous Ammonia (82% N) | 7.997 |
| Water | 42.003 |
| GROUP M | |
| Cane Molasses | 27.526 |
| Water | 22.474 |
| GROUP CPS | |
| Calcium | 0.396 |
| Phosphorus | 0.242 |
| Sulfur | 0.469 |
| Water and inert ingredients | 48.893 |
| GROUP TMS | |
| Sodium | 1.021 |
| Chlorine | 1.919 |
| Magnesium | 0.244 |
| Copper | 0.004 |
| Zinc | 0.030 |
| Iodine | 0.026 |
| Cobalt | 0.0001 |
| Water and Inert Ingredients | 46.7759 |

In cases when two groups were applied, the amount of water was reduced so that the total amount of material applied was 50 pounds per ton of 35 percent dry matter silage.

A single load of corn was utilized in this study which was harvested at the "full dent" stage of maturity from a stand of "Michigan 400" hybrid corn. An excess of rainfall had occurred during the growing season and the corn was yellow in color at the time of harvest. It was also raining during harvest and these two factors combined account for the low dry matter and low protein values obtained.

Steel drums of 55 gallon capacity fitted with airtight covers and heavy 12 mil. thick vinyl sealed bags were used as experimental silos. Each experimental silo was filled by combining the required treatment materials with 400 pounds of chopped corn in a horizontal mixer. After 5 minutes in the mixer, the treated material was packed into the experimental silo, sealed and all air removed with an industrial vacuum cleaner. This procedure has been determined to be equivalent to the effect of packing in an ordinary silo. See Ph D Thesis, Mitchell Geasler, Michigan State University, 1970. 4 months after ensiling, each silo was opened and the upper one-third of the contents removed and sampled; the mid one-third and bottom one-third were removed and sampled in the same way. Samples were placed in a sealed plastic bag and frozen for later analysis. Immediately after thawing the silage samples, total nitrogen was determined by macro-Kjeldahl procedures and percent dry matter determined by oven drying for 24 hours at 55° C. Silage extracts were prepared by homogenizing 25 gram aliquots of samples in a Lourdes Homogenizer with 100 ml of distilled and deionized water for 1 minute and straining through two layers of cheesecloth. A 20 ml aliquot of the extract was used for determining pH and soluble nitrogen. pH was determined on a Corning Model 12 pH meter and soluble nitrogen was determined by micro-Kjeldahl procedures.

The remainder of the extract was deproteinized using 1 ml of 50 percent sulfosalicylic acid (SSA) and 9 ml of extract. The sample was then centrifuged at 18,000 rpm for 10 minutes and stored in a refrigerator for later analysis. Volatile fatty acid content of the silage was determined by injecting samples of the deproteinized silage fluid described above into a Packard gas chromatograph. Colormetric procedures of Barker and Sommerson (1941) were used to determine lactic acid content of the deproteinized sample.

Nitrogen fractionization of the silage was performed as follows: (1) Total nitrogen was determined on the freshly thawed silage sample by macro-Kjeldahl procedures; (2) Total soluble nitrogen was determined on the water extract of the sample before deproteinization by micro-Kjeldahl procedures; (3) Using the deproteinized extract, total water soluble nonprotein nitrogen was determined by micro-Kjeldahl procedures; (4) The difference between water soluble nitrogen and water soluble nonprotein nitrogen was called water soluble protein; and (5) Ammonia nitrogen in the water soluble NPN fraction was determined by the method of Conway (1950).

The following results were observed:
Nitrogen Fractionization: Mean values for all treatment combinations are shown in Table 5.

| | | |
|---|---|---|
| NH₃ Protein, % | 0.38 | 4.13 |
| NO₃ Protein, % | 0.38 | 0.44 |
| Unidentified NPN Protein, % | 1.06 | 0.81 |
| Percent Increase in Crude Protein Equivalent | | 82 |
| Percent of Increase as Organic Protein | | 33 |
| Percent of Increase as NPN | | 67 |
| Percent of NPN as Ammoniacal Nitrogen | 21.00 | 76.06 |
| Percent of NPN as Urea | 10.50 | 7.16 |
| Percent of NPN as Nitrate | 21.00 | 8.10 |
| Percent of NPN as Unidentified | 47.50 | 8.67 |

A similar analysis of acids in the silage was made and the results are recorded in Table 7 along with pH and dry matter content.

TABLE 5

| Silage additive | Silo No. | Total nitrogen | Organic nitrogen | NPN-N total | NH₃-N total | NO₃-N total | Unidentified nitrogen |
|---|---|---|---|---|---|---|---|
| Corn plant | 0 | .95 | | | | | |
| Control | 16 | 1.03 | .75 | .28 | .04 | .06 | .18 |
| Molasses | 9 | 1.07 | .80 | .27 | .05 | .06 | .16 |
| M, CPS | 10 | 1.13 | .82 | .31 | .07 | .06 | .18 |
| M, TMS | 11 | 1.03 | .74 | .29 | .04 | .07 | .18 |
| M, CPS, TMS | 12 | 1.07 | .78 | .29 | .06 | .07 | .16 |
| Calcium, phos., sul | 13 | 1.07 | .79 | .28 | .07 | .07 | .14 |
| CPS, TMS | 14 | 1.07 | .75 | .32 | .06 | .06 | .20 |
| Trace mineral salt | 15 | .97 | .67 | .30 | .06 | .05 | .19 |
| Average¹ | | 1.06 (6.63. | .76 | .29 | .06 | .06 | .17 |
| Ammonia | 1 | 1.83 | 1.08 | .75 | .62 | .09 | .04 |
| A, M | 2 | 1.83 | .98 | .85 | .64 | .07 | .14 |
| A, CPS | 3 | 1.90 | 1.10 | .80 | .67 | .07 | .06 |
| A, TMS | 4 | 1.87 | 1.03 | .84 | .64 | .07 | .13 |
| A, M, CPS | 5 | 1.90 | 1.03 | .87 | .69 | .07 | .11 |
| A, CPS, TMS | 6 | 2.00 | 1.11 | .89 | .70 | .08 | .11 |
| A, M, TMS | 7 | 1.87 | .97 | .90 | .64 | .09 | .17 |
| A, M, CPS, TMS | 8 | 2.10 | 1.06 | 1.04 | .71 | .06 | .27 |
| Average | | 1.91 (11.94. | 1.04 | .87 | .66 | .07 | .13 |

¹ Corn plant values not included in averages.

Since the effects of salts and molasses on nitrogen content were relatively small in comparison with the effects of ammonia, average values were used in further analysis of the effect of ammonia on nitrogen composition, and the results are presented in Table 6.

TABLE 6

| Observation | No Ammonia | Plus Ammonia |
|---|---|---|
| Crude Protein Equivalent, % | 6.56 | 11.94 |
| Organic Protein, % | 4.75 | 6.56 |
| Non-Protein Nitrogen Protein, % | 1.81 | 5.44 |

TABLE 7

| Silage additive | Silo No. | Total O.A. | Acetic acid | Lactic acid | pH | Silage dry matter |
|---|---|---|---|---|---|---|
| Corn plant | 0 | 0.0 | 0.0 | 0.0 | 6.5 | 28.6 |
| Control | 16 | 8.1 | 2.6 | 5.5 | 4.1 | 26.1 |
| Molasses | 9 | 8.4 | 2.3 | 6.5 | 4.1 | 24.6 |
| M, CPS | 10 | 8.9 | 2.5 | 6.4 | 4.1 | 24.3 |
| M, TMS | 11 | 8.9 | 2.4 | 6.5 | 3.9 | 25.4 |
| M, CPS, TMS | 12 | 7.9 | 2.1 | 5.8 | 4.0 | 25.5 |
| Calcium, phos., sul | 13 | 8.7 | 2.4 | 6.3 | 4.0 | 25.3 |
| CPS, TMS | 14 | 8.8 | 2.6 | 6.2 | 3.9 | 24.7 |
| Trace mineral salt | 15 | 8.7 | 2.5 | 6.2 | 3.9 | 26.1 |
| Average¹ | | 8.5 | 2.4 | 6.1 | 4.0 | 25.1 |

TABLE 7 — Continued

| Silage additive | Silo No. | Total O.A. | Acetic acid | Lactic acid | pH | Silage dry matter |
|---|---|---|---|---|---|---|
| Ammonia | 1 | 12.0 | 2.6 | 9.4 | 4.2 | 24.3 |
| A, M | 2 | 11.5 | 2.8 | 8.7 | 4.3 | 25.7 |
| A, CPS | 3 | 10.9 | 2.7 | 8.2 | 4.2 | 24.3 |
| A, TMS | 4 | 11.2 | 2.5 | 8.7 | 4.3 | 25.4 |
| A, M, CPS | 5 | 12.2 | 2.8 | 9.4 | 4.3 | 25.5 |
| A, CPS, TMS | 6 | 10.6 | 2.8 | 7.8 | 4.4 | 23.9 |
| A, M, TMS | 7 | 11.4 | 2.6 | 8.8 | 4.3 | 26.0 |
| A, M, CPS, TMS | 8 | 10.6 | 2.9 | 7.7 | 4.4 | 26.2 |
| Average | | 11.3 | 2.7 | 8.6 | 4.3 | 25.2 |

[1] Corn plant values not included in averages.

While these values vary somewhat more among silos than nitrogen fractionation values, they were averaged to show the effect of ammonia and the data in Table 8 was computed.

TABLE 8

| Observation | No Ammonia | Plus Ammonia |
|---|---|---|
| Total Organic Acid, % | 8.55 | 11.30 |
| Lactic Acid, % | 6.13 | 8.59 |
| Acetic Acid, % | 2.43 | 2.71 |
| Lactic Acid as Percent of Total, % | 71.7 | 76.0 |
| Acetic Acid as Percent of Total, % | 28.4 | 24.0 |
| Percent Increase in Organic Acid | | 32.2 |
| Percent Increase in Lactic Acid | | 40.1 |
| Percent Increase in Acetic Acid | | 11.5 |

The ammonia treatment, then, produced a significant increase in lactic acid content, indicating very high quality silage. A portion of the total acids are in the form of salts with ammonia in the ammonia treated silage, and the ammonia is approximately equivalent to the acetic acid. However, most of the ammonia will be in the form of lactate because lactic acid is a stronger acid.

EXAMPLE 7

A 4 × 2 factorial design was utilized to study the following treatment effects on yearling steers.
A. Four silage treatments
 1. Negative Control Corn Silage — Silage not treated, mineral supplement fed, but no protein supplement fed.
 2. Positive Conrol Corn Silage — Silage not treated, mineral supplement and protein supplement fed (soybean oil meal).
 3. Corn Silage treated at the time of ensiling with a molasses, ammonia mineral mixture whose formulation is given in Table 9, but no protein supplement fed.
 4. Urea Treated Corn Silage — Silage treated at time of ensiling with urea, mineral supplement fed, but no protein supplement fed.
B. All four silage treatments were compared at two levels of concentrate feeding:
 a. Full feed of corn silage with no added shelled cOrn.
 b. Full feed of a mixture of 60 percent corn silage and 40 percent rolled shelled corn on a dry matter basis (equivalent to 1 percent of body weight daily in shelled corn).

Corn for all silages was harvested during a 15 day period from high yielding stands of hybrid corn and stored in concrete stave silos fitted with metal roofs and top unloaders.

The Four experimental silages were made as follows:
 1. and 2. Control Silage (received no additive) was harvested during the entire 15 day period and stored in a 30 × 60 foot silo. Dry matter content of individual loads varied from 28.5 percent to 32.8 percent with an overall average of 30.5 percent.
 3. Silage treated with molasses, ammonia, mineral mixture was harvested over a 2 day period, was stored in a 16 × 50 foot silo and averaged 29.9 percent DM. Individual loads varied from a low of 28.5 percent DM to a high of 31.5 percent DM. The mixture was applied by pumping the required amount of the liquid material (See Table 11) directly into the blower housing as each load of silage was being unloaded and blown into the silo.
 4. Silage treated with urea was harvested over a 3 day period, was stored in a 16 × 50 foot silo, and averaged 28.6 percent dry matter. Individual loads varied from a low of 25.5 percent to a high of 32.5 percent dry matter. Each load was weighted and treated with an equivalent of 12.5 lbs. of urea per ton of 35 percent DM silage. Urea was applied by evenly spreading the required amount over the top of each load just prior to blowing into the silo.

Steers utilized in the experiment were acclimated on a full feed of control silage supplemented with protein, minerals and vitamins until placed on experiment. The experiment was initiated by randomly assigning the steers by weight into the eight treatment groups shown in Table 12 and Table 13.

During the course of the experiment, all steers were fed twice daily and all ratio ingredients were mixed in a horizontal mixer just prior to each feeding. A salt-mineral mixture (See Table 10) was added to the ration at each feeding for all lots receiving control silage or urea treated silage, at a level to equal the amount contained in the silage treated with the ammonia-containing mixture. All steers were implanted with the ammonia-containing mixture. All steers were implanted with 36 mg. of stilbestrol and injected with 5,000,000 units of Vitamin A at the beginning of the trail.

All silages were sampled every Monday, Wednesday and Friday throughout the experiment for oven drying and computing daily dry matter consumption. A composite sample of each silage was analyzed every 2 weeks throughout the trial for nitrogen and organic acid fractions.

At the beginning and end of the feeding experiment, all cattle were individually weighed on 2 successive days and the average of the 2 day weights was used as initial and final weights. During the course of the experiment, all lots of cattle were group weighed every 28 days.

At the conclusion of the experiment and immediately following the final weight, all cattle were trucked 100 miles, allowed to stand over night and slaughtered during the morning of the next day. After 48 hours in the cooler, carcasses were ribbed, graded and carcass measurements taken. Kidney, heart and pelvic fat was estimated and fat and lean tracings were made of the thirteenth rib for accuracy in determining cutability grade, fat thickness and ribeye area.

CHEMICAL ANALYSIS OF SILAGES

Results of nine different analyses conducted on each silage during the feeding trial are shown in Table 11. All three silages were quite similar in percent dry matter and did not differ substantially from values obtained while filling the silos.

The ammonia mixture and the urea additions increased crude protein content of the silage 48 percent and 59 percent, respectively, with no apparent difference between the two treatments in this respect. Increases in crude protein content accounted for approximately 95 percent of the nitrogen applied in both cases.

Nitrogen fractionization of the ammonia treated silage revealed 21 percent of the increase in total crude protein was in the form of organic protein, 58 percent in the form of ammonium salts, and 21 percent remained as unidentified nitrogen compounds. For the urea treated silage, 19 percent of the increase was in the form of organic protein, 20 percent as ammonium salts, 57 percent remained as urea and 4 percent as unidentified nitrogen compounds. Differences between the ammonia and urea treated silages for both percent ammonium salts and percent urea were extremely large and highly significant ($P < 0.01$).

Both treatment programs had a large and highly significant ($P < 0.01$) effect on organic acid content of the silage. Lactic acid was increased 81 percent and acetic acid reduced 31 percent for the ammonia treated silage. For the urea treated silage, lactic acid was increased 35 percent and acetic acid increased 5 percent. Ammonia treated silage and urea treated silage showed highly significant ($P < 0.01$) differences in lactic acid levels, and significant ($P < 0.05$) differences in acetic acid levels.

SILAGE ADDITIVES COMPARED:

Results of this comparison for the 1 percent concentrate ration are shown in Table 12 and for the all silage ration in Table 13. For both the 1 percent concentrate ration and the all silage ration, ammonia and urea treated silage (both fed without additional protein supplementation) proved equal to control silage supplemented with soybean oil meal at feeding time for all production and economic traits measured. Although average daily gain and carcass quality values (shown in Table 12 for the 1 percent concentrate ration) favored the ammonia and urea treated silage fed groups, the differences did not prove to be significant. For the all silage ration shown in Table 13, average daily gain values were nearly identical for all three groups with most of the carcass quality values favoring the control silage fed group; however, the differences were small and insignificant. For both the 1 percent concentrate ration and the all silage ration, results for cattle receiving control silage with no additional protein supplementation were extremely poor. As a result of their poor performance, the cattle were not slaughtered at the conclusion of the experiment; thus, no carcass data are presented for this group.

For both the 1 percent concentrate and all silage ration, feed efficiency of the treated silage fed groups was superior to the control silage fed group (soy supplemented), and appears to be correlated with percent organic acid content of the ration. As a result of the improved feed efficiency and the reduced cost of providing supplemental protein, feed cost per cwt. gain was reduced approximately $2.00 for the treated silage fed groups. Total cost of providing supplement for the entire feeding period was reduced 3.4 times by treating the silage with ammonia mixture and 2.8 times by treating the silage with urea.

In summary, treating corn silage at harvest time with the ammonia mixture equaled control silage supplemented with soybean oil meal and minerals at feeding time as measured by yearling steer performance at 29 percent of the cost of soybean oil meal and minerals. Urea treatment also equaled soybean oil meal at 36 percent of the cost.

1 PERCENT RATION VS. ALL SILAGE RATION

Results from Table 12 and Table 13 have been pooled (does not include negative control group) and are presented in Table 14. Average daily gain of the all silage fed group was significantly ($P < 0.01$) lower by 16 percent than that of the 1 percent concentrate fed group (2.76 lb. vs. 2.30 lb.) and length of feeding period was increased 16 percent (110 days vs. 128 days). However, feed cost per cwt. of gain was reduced $2.34 ($11.74 vs. $14.08) and pounds of beef produced per acre of corn fed increased 67 percent (1,984 lbs. vs. 1,185 lbs.) with no reduction in carcass grade (both groups graded low Choice). All factors making up cutability grade favored the all silage fed group. Daily dry matter consumption (expressed on an 85 percent DM basis) was greatly depressed for the all silage fed group and accounts for virtually all of the reduction in average daily gain. However, in spite of the reduced DM consumption, feed efficiency was nearly identical for the two groups. This has been the case in all previous experiments and emphasizes the high energy value of high quality corn silage.

TABLE 9

MOLASSES-AMMONIA-MINERAL MIXTURE FORMULATION

| Element | Percent |
|---|---|
| Molasses | 55.12 |
| Water and inert ingredients | 23.04 |
| Nitrogen | 13.13 |
| Calcium | 0.7936 |
| Phosphorus | 0.4850 |
| Sodium | 2.0450 |
| Chlorine | 3.8420 |
| Sulfur | 0.9371 |
| Magnesium | 0.4886 |
| Zinc | 0.597 |
| Copper | 0.0088 |
| Cobalt | 0.0002 |
| Iodine | 0.0530 |
| TOTAL | 100.0% |

TABLE 10

| Ingredient | Percent |
|---|---|
| Discalcium Phosphate (26.5%C-20.5%P) | 16.8 |
| Trace mineral salt (High Zn) | 11.2 |
| Sodium Sulfate (22.5%S) | 10.2 |
| Ground Shelled Corn | 61.8 |
| TOTAL | 100.0% |

[1] Added to control silage and urea treated silage at the rate of 5% of silage dry matter.

TABLE 11

AVERAGE CHEMICAL ANALYSIS [1]

| Dry Matter Analysis | Control No Additive | Ammonia Mixture 40.2 lb/t[2] | Urea 10.7 lb/t[3] |
|---|---|---|---|
| Percent dry matter | 29.64 | 29.93 | 28.23 |
| Percent crude protein | 7.88 | 12.44 | 12.56 |
| Nitrogen Fractions: | | | |
| Total Nitrogen | 1.26[B] | 1.99[A] | 2.01[A] |
| Organic Nitrogen | 0.87 | 1.02 | 1.01 |
| NPN Nitrogen | 0.39[B] | .97[A] | 1.00[A] |
| Ammonia N | 0.07[B] | 0.49[A] | 0.22[B] |
| Urea N | 0.01[B] | 0.01[B] | 0.44[A] |
| Unidentified N | 0.31 | 0.47 | 0.34 |
| Organic Acid Fractions: | | | |
| Total organic acid | 8.68[B] | 11.62[A] | 10.79[A] |
| Acetic acid | 3.64[a] | 2.48[b] | 3.84[a] |
| Lactic acid | 5.04[C] | 9.14[A] | 6.85[B] |
| pH | 4.0 | 4.2 | 4.0 |

[1] Each value is the mean of 8 different composite samples taken every two weeks during the feeding trial.
[2] Equivalent to 50 lb/ton 35% DM silage.
[3] Equivalent to 12.5 lb/ton 35% DM silage Significance:
[A,B,C] Values having different superscripts differ significantly (P<0.01).
[a,b] Values having different superscripts differ significantly (P<0.05).

TABLE 12

1% CONCENTRATE RATION

| 110 Day Test | Negative Control | Positive Control | Ammonia Mixture 40.2 lb/t | 10.7 lb/t Urea |
|---|---|---|---|---|
| No. yearling steers | 9 | 9 | 9 | 9 |
| Av. initial wt., lb. | 808 | 815 | 814 | 810 |
| Av. final wt., lb. | 1058 | 1110 | 1116 | 1124 |
| Av. daily gain, lb. | 2.27* | 2.68 | 2.75 | 2.85 |
| Daily Feed, Lb. 85% DM: | | | | |
| Corn Silage | 10.61 | 11.35 | 12.90 | 12.59 |
| Gr. Shelled Corn | 7.48 | 7.98 | 8.47 | 8.75 |
| Soybean Oil Meal | | 1.47 | | |
| Salt Minerals | .48 | .51 | | .58 |
| Total | 18.57 | 21.32 | 21.38 | 21.93 |
| Percent of body weight | 1.99 | 2.22 | 2.22 | 2.27 |
| Ration DM analysis: | | | | |
| Percent crude protein | 9.18 | 12.60 | 11.93 | 11.86 |
| Percent organic acid | 4.96 | 4.62 | 7.01 | 6.19 |
| Feed Efficiency: | | | | |
| Feed per lb. gain, lb. | 8.18 | 7.96 | 7.77 | 7.69 |
| Feed cost/cwt. gain[1] | $13.87 | $15.29 | $13.54 | $13.42 |
| Total cost of supplement[1] | Nil | $10.33 | $2.80 | $3.49 |
| Carcass Evaluation: | | | | |
| Carcass grade [2] | | 12.22 | 12.22 | 12.89 |
| Marbling score [3] | | 15.78 | 15.11 | 16.67 |
| Fat thickness, in. | | .56 | .70 | .66 |
| Rib eye area, sq. in. | | 14.06 | 12.82 | 12.98 |
| Percent K.H.P. fat [4] | | 2.39 | 2.72 | 2.50 |
| Percent B.T.R. cuts[5] | | 51.4 | 49.4 | 49.9 |
| Dressing percent[6] | | 59.82 | 60.53 | 59.27 |
| Carcass price | | $49.17 | $49.17 | $49.44 |

* Significantly different from all other values (P < 0.01).
[1] Feed cost: 30% DM corn silage $8.50 T, sh. corn $45 T, soy $100 T, mineral $80 T, urea $80 T, Ammonia mixture $65 T.
[2] Carcass grade code — Good = 9, 10, 11; Choice = 12, 13, 14.
[3] Marbling code — Small = 10, 11, 12; Modest = 13, 14, 15; Moderate = 16, 17, 18.
[4] Percent of carcass weight in kidney, heart and pelvic fat.
[5] Percent of carcass weight in boneless, trimmed, retail cuts.
[6] Dressing percent = cold carcass weight over final weight off experiment.

TABLE 13

ALL SILAGE RATION

| 128 Day Test | Negative Control | Positive Control | Ammonia Mixture 40.2 lb/t | 10.7 lb/t Urea |
|---|---|---|---|---|
| No. yearling steers | 9 | 9 | 9 | 9 |
| Av. initial wt., lb. | 814 | 816 | 818 | 808 |
| Av. final wt., lb. | 1015 | 1113 | 1112 | 1102 |
| Av. daily gain, lb. | 1.57* | 2.31 | 2.30 | 2.29 |
| Daily Feed, Lb. 85% DM: | | | | |
| Corn Silage | 14.49 | 16.67 | 17.49 | 17.41 |
| Soybean oil meal | | 1.57 | | |
| Salt minerals | .64 | .74 | | .77 |
| Total | 15.12 | 18.98 | 17.49 | 18.18 |
| Percent of body weight | 1.65 | 1.97 | 1.81 | 1.90 |
| Ration DM Analysis: | | | | |
| Percent crude protein | 7.85 | 12.03 | 12.44 | 12.33 |
| Percent organic acid | 8.32 | 7.62 | 11.62 | 10.33 |
| Feed Efficiency: | | | | |
| Feed per lb. gain, lb. | 9.63 | 8.22 | 7.60 | 7.94 |
| Feed cost/cwt. gain[1] | $12.71 | $13.34 | $10.72 | $11.15 |
| Total cost of supplement[1] | Nil | $13.84 | $4.42 | $5.29 |
| Carcass Evaluation: | | | | |
| Carcass Grade[2] | | 12.67 | 12.13 | 11.78 |
| Marbling score[3] | | 16.65 | 15.00 | 14.67 |
| Fat thickness, in. | | .57 | .58 | .50 |
| Rib eye area, sq. in. | | 12.87 | 12.85 | 12.17 |
| Percent K.H.P. fat[4] | | 2.44 | 2.19 | 2.22 |
| Percent B.T.R. cuts[5] | | 50.5 | 50.8 | 50.6 |
| Dressing percent 6 | | 59.10 | 58.74 | 58.16 |
| Carcass price | | $49.44 | $48.75 | $48.61 |

* Significantly different from all other values (P < 0.01)
[1] Feed cost: 30% DM corn silage $ 8.50 T, sh. corn $45 T, soy $100 T, mineral $80 T, urea $80, ammonia mixture $65 T.
[2] Carcass grade code — Good = 9, 10, 11; Choice = 12, 13, 14.
[3] Marbling Code — Small = 10, 11, 12; Modest = 13, 14, 15; Moderate = 16, 17, 18.
[4] Percent of carcass weight in kidney, heart and pelvic fat
[5] Percent of carcass weight in boneless, trimmed, retail cuts
[6] Dressing percent = cold carcass weight over final weight off experiment.

TABLE 14

ALL SILAGE vs. 1% CONCENTRATE RATION

| | 1% Concentrates 110 Days on Test | All Silage 128 Days on Test |
|---|---|---|
| No. yearling steers | 36 | 36 |
| Av. initial wt., lb. | 813 | 814 |
| Av. final wt., lb. | 1117 | 1109 |
| Av. daily gain, lb. | 2.76* | 2.30 |
| Daily Feed, Lb. 85% DM: | | |
| Corn silage | 12.28 | 17.19 |
| Gr. shelled corn | 8.40 | |
| Soybean oil meal | 0.49 | .52 |
| Salt minerals | 0.36 | .50 |
| Total | 21.53 | 18.21 |
| Percent of body weight | 2.24 | 1.89 |
| Ration DM Analysis: | | |
| Percent crude protein | 12.13 | 12.27 |
| Percent organic acid | 5.94 | 9.86 |
| Feed Efficiency: | | |
| Feed per lb. gain, lb. | 7.81 | 7.92 |
| Feed cost/cwt. gain[1] | $14.08 | $11.74 |
| Total cost of supplement[1] | %5.54 | $7.85 |
| Carcass Evaluation: | | |
| Carcass grade[2] | 12.44 | 12.19 |
| Marbling score[3] | 15.85 | 15.41 |
| Fat thickness, in. | .64 | .55 |
| Rib eye area, sq. in. | 13.29 | 12.63 |
| Percent K.H.P. fat[4] | 2.54 | 2.28 |
| Percent B.T.R. cuts[5] | 50.2 | 50.6 |
| Dressing percent 6 | 59.87 | 58.67 |
| Carcass price | 49.26 | 48.93 |
| Beef/acre corn fed, lb.[7] | 1185 | 1984 |
| Steers fed/acre corn fed, head | 3.9 | 6.73 |

* Significantly different from all other values (P < 0.01).
[1] Feed cost: 30% DM corn silage $8.50 T, sh. corn $45 T, soy $100 T, mineral $80 T, urea $80 T, ammonia mixture $65 T.
[2] Carcass grade code — Good = 9, 10, 11; Choice = 12, 13, 14.
[3] Marbling code — Small = 10, 11, 12; Modest = 13, 14, 15; Moderate = 16, 17, 18.
[4] Percent of carcass weight in kidney, heart and pelvic fat.
[5] Percent of carcass weight in boneless, trimmed, retail cuts.
[6] Dressing percent = cold carcass weight over final weight off experiment
[7] Based on yield of 18T of 35% DM corn silage or 100 bu. shelled corn

EXAMPLE 8

A 2 × 2 factorial design was used to study the effect of the following four treatments on yearling steer performance when rye silage made up 40 percent of the dry matter intake and shelled corn made up 60 percent of the dry matter intake:

1. Rye silage treated with ammonia, mineral, molasses mixture shown in Table 15, with no added supplementation at feeding time.
2. Rye silage treated with the same ammonia, mineral and molasses mixture, with soybean oil meal added at feeding time at a level to increase crude protein content of the total ration two percentage units.
3. Rye silage receiving no treatment at ensiling time but with sufficient urea added at feeding time to raise crude protein content of the total ration to the same level as in Item 1 with salt and minerals fed free choice.
4. Same as Item 3 but with soybean oil meal added at feeding time as outlined in Item 2.

Choice yearling Hereford steers utilized in the trial were from a group purchased at an average weight of 732 pounds and shrunk 5 percent on transit to the experimental facilities. They had been wintered on hay prior to shipment and were fed corn silage and supplement for 28 days after arrival and prior to the start of the experiment when their average weight was 788 pounds.

A hybrid variety of rye was harvested which was in the "boot" stage of maturity and no seed heads had formed at the time of harvest. Rye was cut, crimped and windrowed in a single operation, allowed to wilt in the windrow for about 4 hours and picked up with a self propelled field chopper.

Both the treated and non-treated silage was stored in 12 feet × 50 feet concrete stave silos fitted with metal roofs and top unloaders, 20 days prior to the start of the test. Both silos were filled simultaneously by utilizing alternate loads of silage.

Figure 3:
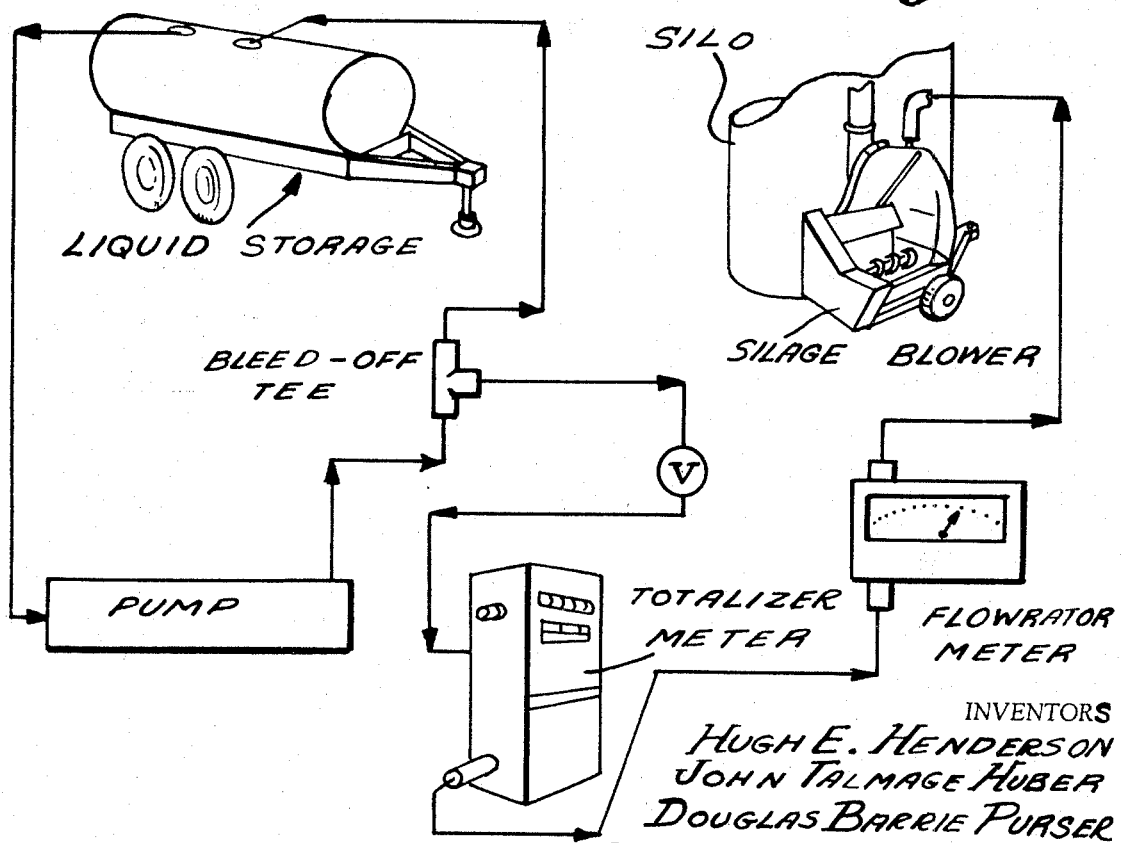

The ammonia molasses and mineral mixture, as formulated in Table 15, was applied at the rate of 5 gallons (50 pounds) per ton of 30 percent DM material by pumping from a storage tank directly into the blower housing of the silage blower as shown in FIG. 3. Each load of silage was sampled for dry matter and the correct amount of ammonia mixture was applied by utilizing a rate of flow and totalizer meter between the pump and silage blower.

The feeding experiment was carried out a total of 87 days on test. Insufficient feed was available to continue the experiment to slaughter weights and condition; therefore, all steers were switched to haylage and shelled corn and continued on feed for another 40 days prior to slaughter. Therefore, no carcass data could be collected for this experiment.

Initial and final weights were taken by individually weighing all steers on 2 successive days and using the average of the 2 day weights.

For oven drying and computing daily dry matter consumption, silage samples were taken from each silo every day throughout the trial. A total of seven silage samples were taken periodically from each silo for laboratory analysis.

All steers were full fed twice daily and all ration components were thoroughly mixed in a horizontal mixer prior to each feeding. Steers not receiving ammonia-treated silage were provided a mineral supplement on a free choice basis composed of 37.5 percent sodium sulfate, 31.25 percent trace mineral salt and 31.25 percent dicalcium phosphate. All steers were implanted with 36 mg. of diethylstilbestrol at the beginning of the experiment.

RESULTS

Samples taken from each load of freshly chopped rye averaged 21.2 percent dry matter (varying from a low of 19 percent to a high of 23 percent DM) and 15.2 percent crude protein on a dry matter basis. Samples of silage reported in Table 16 averaged 21.5 percent dry matter and 21.25 percent crude protein on a DM basis for the treated silage and 21.0 percent dry matter and 15.4 percent crude protein on a dry matter basis for the control silage which received no treatment. This represents a 41.3 percent increase in crude protein content of the treated silage and accounts for approximately 97 percent of the nitrogen contained in the mixture applied. Nitrogen fractionization of the treated silage revealed that essentially all of the increase in crude protein content was in the form of ammonium salts.

Silage samples taken during August were also analyzed for volatile fatty acids and lactic acid. Results of the acetic and lactic acid analysis are shown in Table 17. Acetic acid content of treated silage on a dry matter basis was increased 45 percent (3.07 percent vs. 2.12 percent), lactic acid increased 13 percent (12.7 percent vs. 11.33 percent) and total organic acid increased 18 percent (15.85 percent vs. 13.45 percent). Analysis was also conducted for the branched chain fatty acids but levels were too low for accurate determinations; therefore, data are not included in the total organic acid values. Lactic acid values for both silages are higher than expected and compare very favorably with values obtained for well fermented corn silage of comparable dry matter content. Both silages were of high quality and were readily consumed by the experimental animals.

Extensive seepage occurred from both silos for about one week following filling with no observed difference in the quantity of seepage between the treated and control silage. On the third day following filling, 1 quart of seepage was collected from each silo and analyzed for total ash and nitrogen content. No difference was found between the two samples; therefore, it appears that ammonia addition did not increase the mineral or nitrogen content of the seepage and that essentially all of the mixture applied was retained in the silo.

Complete results of the feeding trail are shown in Table 18. All rations were readily consumed with no apparent difference in palatability. Average daily gain of steers fed treated rye silage with no added supplement was 8 percent greater (2.90 lb. vs. 2.68 lb) than those receiving control silage with urea and mineral supplement provided at feeding time. The addition of soybean oil meal to treated silage at feeding time increased average daily gain 3 percent (3.00 lb. vs. 2.90 lb.) over the group receiving no added soybean oil meal, whereas the same level of soybean oil meal addition to the control silage plus urea and mineral supplement increased average daily gain 27 percent (3.41 lb. vs. 2.68 lb.) over the group receiving control silage, urea and minerals.

Daily dry matter consumption expressed as a percent of body weight was lowest for the group receiving treated silage with no added supplementation which was also highest in organic acid content. Consumption was highest for the group receiving control silage supplemented with urea, minerals and soybean oil meal, the lowest in organic acid content. These results are in complete agreement with a large amount of silage work in which daily dry matter consumption has consistently been lower on silages having the highest organic acid content. Feed efficiency and feed cost were about equal for the group receiving treated silage without supplementation and the group receiving control silage with urea, mineral and soybean oil meal supplementation. Both groups were superior to the remaining two groups and especially superior to the group receiving control silage, urea and mineral supplementation. It did not provide profitable to supplement the treated silage with soybean oil meal, whereas the practice proved extremely profitable for the group receiving control silage supplemented with urea and minerals.

TABLE 15

Formulate of Ammonia, Mineral, Molasses Mixture

| Element | Percent |
| --- | --- |
| Molasses | 55.12 |
| Water and inert ingredients | 23.04 |
| Nitrogen | 13.13 |
| Calcium | 0.7936 |
| Phosphorus | 0.4850 |
| Sodium | 2.0450 |
| Chlorine | 3.8420 |
| Sulfur | 0.9371 |
| Magnesium | 0.4886 |
| Zinc | 0.0597 |
| Copper | 0.0088 |
| Cobalt | 0.0002 |
| Iodine | 0.0530 |
| TOTAL | 100.0% |

TABLE 16

Crude Protein Analysis (Protein Values Expressed as a Percent of Total Dry Matter)

| Sample Date | Ammonia Treated Silage | | Control Silage | |
| --- | --- | --- | --- | --- |
| | Percent Drymatter[1] | Percent Crude Protein[2] | Percent Drymatter | Percent Crude Protein |
| 8/11 | 21.0 | 21.44 | 21.0 | 14.88 |
| 8/14 | 22.0 | 19.81 | 21.5 | 14.56 |
| 8/18 | 21.5 | 19.94 | 20.5 | 15.00 |
| 8/25 | 20.9 | 23.56 | 20.9 | 15.44 |
| 8/28 | 20.6 | 23.75 | 20.8 | 16.25 |
| 9/3 | 21.1 | 20.69 | 20.9 | 15.50 |
| 9/8 | 23.1 | 19.56 | 21.6 | 13.63 |
| Average | 21.5 | 21.25 | 21.0 | 15.04 |

[1] Oven determination
[2] Macro-Kjeldahl determination

TABLE 17.—ORGANIC ACID ANALYSIS (EXPRESSED AS A PERCENT OF TOTAL DRY MATTER)

| Sample date | Ammonia treated silage | | | | Control silage | | | |
| --- | --- | --- | --- | --- | --- | --- | --- | --- |
| | Acetic acid | Lactic acid | Total acetic lactic | pH | Acetic acid | Lactic acid | Total acetic lactic | pH |
| 8/14 | 2.7 | 13.8 | 16.5 | 4.1 | 2.8 | 10.4 | 13.2 | 3.8 |
| 8/18 | 2.7 | 13.8 | 16.5 | 3.9 | 2.7 | 11.4 | 14.1 | 2.4 |
| 8/25 | 4.1 | 10.3 | 14.4 | 4.4 | 2.4 | 11.4 | 13.8 | 3.9 |
| 8/28 | 4.2 | 14.6 | 18.8 | 3.8 | 2.4 | 11.9 | 14.3 | 2.6 |
| 9/3 | 3.4 | 12.7 | 16.1 | 3.3 | 1.0 | 12.3 | 13.3 | 2.5 |
| 9/8 | 1.3 | 11.5 | 12.8 | 3.2 | 1.4 | 10.6 | 12.0 | 2.2 |
| Average | 3.07 | 12.78 | 15.85 | 3.8 | 2.12 | 11.33 | 13.45 | 2.9 |

TABLE 18

Feeding Results Treated Rye Silage Vs. Control Rye Silage

| 87 Day Test | Treated Silage | | Control Silage | |
| --- | --- | --- | --- | --- |
| | No. Supp. | Soy Supp. | Urea Supp. | Soy Supp. |
| Lot number | 42 | 41 | 43 | 44 |
| No. steer Calves | 6 | 6 | 6 | 6 |
| CP content of ration, DM% | 14.70 | 16.38 | 14.09 | 15.85 |
| Av. initial wt., lb. | 861 | 861 | 861 | 855 |
| Av. final wt., lb. | 1113 | 1122 | 1094 | 1152 |
| Av. daily gain, lb. | 2.90 | 3.00 | 2.68 | 3.41 |
| Daily Feed, Lb. 85% DM: | | | | |
| Rye silage | 8.97 | 9.58 | 9.01 | 9.71 |
| Shelled corn | 13.93 | 13.79 | 14.86 | 15.04 |
| Soy | — | 0.90 | — | 0.98 |
| Urea | — | — | .14 | 0.16 |
| Total | 22.90 | 24.27 | 24.01 | 25.89 |
| Percent of BWD | 2.32 | 2.45 | 2.46 | 2.58 |
| Feed Efficiency: | | | | |
| Feed per lb. gain, lb[1] | 7.90 | 8.09 | 8.96 | 7.59 |
| Feed cost/cwt. gain,$[1] | $14.15 | $15.09 | $16.03 | $14.17 |

[1] Feed costs are based on ammonia, molasses, mineral mixture at $80.00 per ton, urea at $80.00 per ton, soybean oil meal at $80.00 per ton, mineral supplement at $60.00 per ton and 21% DM rye silage at $6.00 per ton.

EXAMPLE 9

Corn silage was harvested for silage when the moisture content was approximately 35 percent. A portion of the chopped forage was stored without an additive in an upright silo; another portion was ensiled in an upright silo, but at the time of ensiling, urea at the rate of 10 pounds per ton of green weight was added; and a third portion of chopped corn plant was ensiled in an upright silo, but at the time of ensiling the ammonia-molasses-mineral mixture of Table 3 at the rate of 50 pounds per ton of green weight was added by the method already described.

Each kind of silage was fed to a pen of yearling cattle. In addition to receiving silage each pen of cattle was fed ground shelled corn to appetite. The control pen (corn silage without an additive) was fed, in addition, one pound per head daily of a supplement which contained a protein equivalent of approximately 71 percent and minerals and vitamin A. Pens of cattle receiving the urea-containing and the ammonia containing corn silage did not receive the supplement. The animals were fed 97 days at which time they were sold for slaughter and carcass information was collected.

RESULTS

The animals fed ammonia treated silage, urea silage and control silage made daily gains (lb.) of 2.53, 2.14 and 2.27, respectively. In the same order the corn rations per pound of gain were 6.20, 7.34, and 6.38 pounds. Also in the same order of listing, the feed costs per pound of gain were 20.8, 23.4 and 22.0, cents. These data are summarized in Table 19.

Based on these results the ammonia-molasses-mineral mixture was a more valuable additive to the corn plant stored as silage than was urea. Also, the addition of that mixture to corn silage permitted the corn silage to be fed at a lower cost per unit of gain than the feeding of corn silage without additive but supplemented with a dry feed at the time of feeding.

TABLE 19

| Item | Regular Corn Silage | Corn Silage with Urea | Corn Silage with Ammonia |
|---|---|---|---|
| Number of animals per pen | 10 | 10 | 10 |
| Days on test | 97 | 97 | 97 |
| Initial weight, lb. | 752.0 | 724.0 | 723.5 |
| Final weight, lb. | 972.4 | 932.3 | 968.5 |
| Gain per animal, lb. | 220.4 | 208.3 | 245.0 |
| Average Daily Gain, lb. 2.27 | | 2.14 | 2.53 |
| Daily average Ration, lb: | | | |
|   Silage | 20.05 | 21.37 | 23.25 |
|   Corn | 14.48 | 15.70 | 15.69 |
|   Supplement | 1.00 | — | — |
| Feed per lb. gain (lb.): | | | |
|   Silage | 8.83 | 9.99 | 9.19 |
|   Corn | 6.38 | 7.34 | 6.20 |
|   Supplement | 0.44 | — | — |
| Feed Cost per lb. gain (cents)[1]: | | | |
|   Silage | 3.5 | 4.2 | 4.6 |
|   Corn | 16.7 | 19.2 | 16.2 |
|   Supplement | 1.8 | | |
|   Total (cents) | 22.0 | 23.4 | 20.8 |

[1]Feed Prices:
  Corn Silage — $0.40/cwt.
  Ground shelled corn — $2.62/cwt.
  Supplement — $4.00/cwt.
  Corn silage with ammonia treatment — $0.50/cwt.
  Corn silage with Urea — $0.42/cwt.

EXAMPLE 10

To extend the evaluation of mineral addition at the time of ensiling, metabolic studies were carred out at the same time as the experiment described in Example 6. Three silos were filled, one with untreated corn, one with molasses at the rate indicated in Example 6, and one with the minerals designated CPS and TMS in the proportions and at the rate indicated in Example 6. In feeding the resultant silages, mineral supplements of groups CPS and TMS were added to the control and molasses treated silages so that the rations all contained equal amounts of these minerals. The results of the study were as follows:

| | Nitrogen Retention as a Percentage of Absorbed Nitrogen |
|---|---|
| Control Silage | 30 |
| Molasses Treated Silage | 36 |
| Mineral Treated Silage | 60 |

These results, considered in light of the data in Example 6, show that the minerals TMS and CPS affected the nature of the nitrogen compounds, especially in the components designated "unidentified" in Table 5. The three rations in this experiment were all deficient in nitrogen, so that the effects were magnified in comparison from those to be expected if ammonia had been added at the time of ensiling. Nevertheless, in view of these data, it is considered preferable to include the aforesaid minerals in the material applied to plant material at the time of ensiling.

The minerals applied should be sufficient to supply the needs of the ruminant animal for which the feed is intended and which are not normally present in the plant material. These vary somewhat depending on the plant material and the animal. However, with one exception indicated below, the mineral requirements of ruminant animals are approximately the same and the minerals to be applied at the time of ensiling are approximately the same. The preferred rates of application, per ton of 35 percent dry matter silage are as follows:

| | |
|---|---|
| Sodium | 425 – 750 grams |
| Calcium | 215 – 380 grams |
| Magnesium | 40 – 75 grams |
| Copper | 1.5 – 3.0 gram |
| Zinc | 10 – 18 grams |
| Cobalt | 30 – 55 milligrams |
| Phosphorus | 135 – 240 grams |
| Sulfur | 210 – 375 grams |
| Chlorine | 650 – 1150 grams |
| Iodine | 135 – 240 milligrams |

The amounts are adjusted in accordance with the dry matter content of the plant material so that the same mineral-to-dry matter ratio is maintained. In addition, if molasses is used, it may be necessary to take into account any minerals in the molasses. The amounts of ammonia (0.5 – 2.5 percent based on dry matter) correspond to 3.5 to 17.5 pounds per ton of 35 percent dry matter plant material, preferably 3.5 to 15 pounds. For corn (maize) the preferred range is 3.5 to 11.2 pounds, preferably 5 – 11.2 pounds. One other consideration should be observed, i.e., the ratio of sulfur to nitrogen which may be 1:5–11.5 on a weight basis, preferably 1:10. The amount of sulfur required actually is based on the ratio of nitrogen sulfur of 1:15 in protein synthesized by the animal from the ammonia. However, some sulfur is wasted and an excess should be applied. A ratio of about 1:10 is considered reasonably safe.

The exception to these mineral requirements are high producing daily animals. For example, a high-producing dairy cow (40 pounds or more of milk per day) requires more calcium and phosphorus. However, it is more convenient to add these minerals at feeding time to avoid the need for having to produce several lots of silage for animals at different stages of milk production.

The minerals may be introduced in the form of conventional inorganic salts. For instance, sodium may be provided as +1 cation, calcium, magnesium and zinc as +2 cation, copper as +1 or +2 cation, cobalt as +2 or +3 cation, phosphorus as phosphate or the anion of another oxy acid of phosphorus, sulfur as sulfate, sulfate etc., chlorine as chloride and iodine as $I_2$ or iodine.

It will be appreciated that, while preferred embodiments have been described, the invention has application to a wide variety of plant materials and animals. Therefore, no limitation to the embodiments described is intended.

Figure 4:
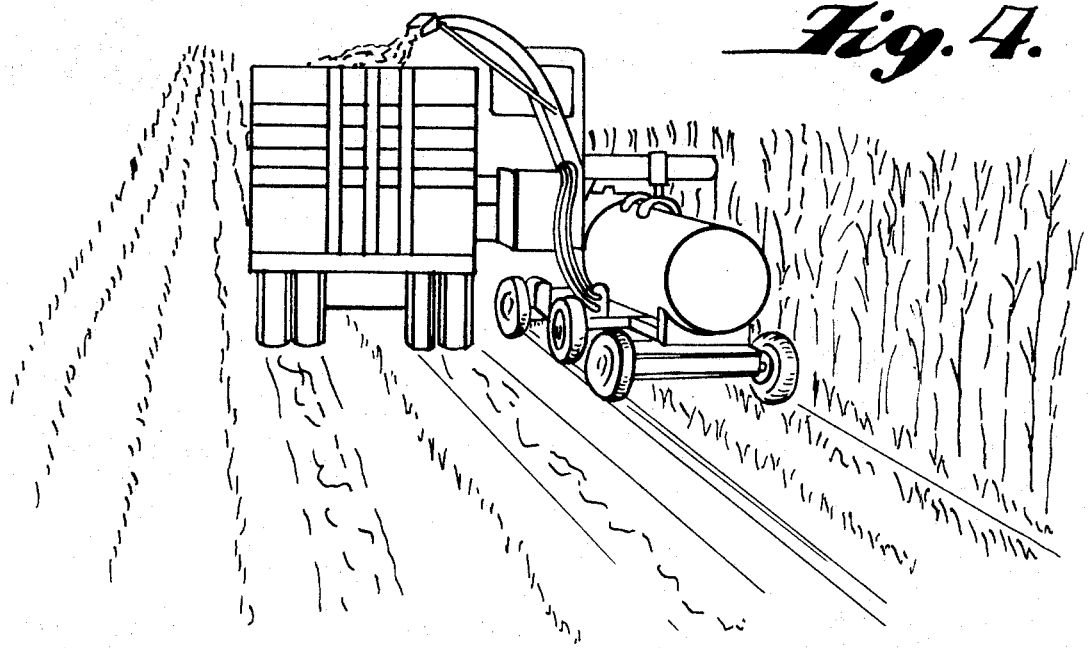

In all cases silage compositions have been stated on a basis of dry matter and proportions on a weight basis unless otherwise stated. The cost estimates of various materials were based on prices of the various materials at the approximate times of the experiments and in the areas (East Lansing, Michigan; and Auburn, Alabama) where the experiments were performed. In all of the experiments described, except where drum-type experimental silos were used, and except where otherwise stated, the materials were stored in upright silos and the ammoniacontaining materials were applied as shown (schematically in part) in FIG. 3. However, experiments have been performed on treating corn for bunker silos as shown schematically in FIG. 4. In that procedure, the treating agent is applied to the blower housing from a tank trailer and the treated chopped plant material is transported, e.g., on a wagon, to the storage trench.

We claim:

1. A method for manufacturing a feed for ruminant animals which comprises intimately and uniformly mixing an anaerobically fermentable plant material with an aqueous solution of ammonia in an amount sufficient to furnish 0.5 to 2.5 percent ammonia by weight of the dry matter of said plant material until the average amount of ammonia in substantially each cubic foot volumetric unit of plant material is less than 2.5 percent by weight of the dry matter and fermenting the resultant mixture under substantially anaerobic conditions at least until the ammonia has been converted to nitrogen compounds which are consumable by ruminant animals.

2. A method as set forth in claim 1 in which the nitrogen compounds include ammonium salts and microbial protein.

3. A method for manufacturing a feed for ruminant animals which comprises intimately and uniformly mixing an anaerobically fermentable chopped plant material having a dry matter content of 25–60 percent and an aqueous solution of ammonia in an amount sufficient to furnish 0.5 to 2.5 percent ammonia by weight of the dry matter of said plant material until the average amount of ammonia in substantially each cubic foot volumetric unit of plant material is less than 2.5 percent by weight of the dry matter and fermenting the resultant mixture under substantially anaerobic conditions at least until the ammonia has been converted to nitrogen compounds which are consumable by ruminant animals.

4. A method as set forth in claim 3 in which the nitrogen compounds include ammonium salts and microbial protein.

5. A method as set forth in claim 3 in which the amount of ammonia is 0.5–2 percent by weight of the dry matter.

6. A method as set forth in claim 3 in which the dry matter is 30–35 percent.

7. A method as set forth in claim 3 in which the plant material is corn, grass, legume, small grain or sorghum.

8. A method as set forth in claim 7 in which the plant material is corn and the amount of ammonia is 0.5 – 1.6 percent by weight of the dry matter.

9. A method as set forth in claim 8 in which the amount of ammonia is 1–1.6 percent by weight of the dry matter.

10. A method as set forth in claim 3 in which the average amount of ammonia in each volumetric unit is within 25 percent of the average value of the plant material.

11. A method as set forth in claim 10 in which the average amount of ammonia in each volumetric unit is within 10 percent of the average value of the plant material.

12. A method as set forth in claim 3 in which the ammonia is in the form of a liquid composition containing molasses.

13. A method as set forth in claim 12 in which the ammonia is in the form of a liquid containing molasses and mineral salts which supply the needs of the ruminant animals for which the feed is intended and which are not normally present in adequate amounts in said plant material.

14. A method as set forth in claim 13 in which the amount of ammonia is sufficient to increase the nitrogen content of the feed to that required by the ruminant animals for which the feed is intended, so that the feed is complete and requires no additional nitrogen supplementation.

15. A ruminant animal feed manufactured by the method of claim 14.

* * * * *